US007833338B2

(12) United States Patent
Crews et al.

(10) Patent No.: US 7,833,338 B2
(45) Date of Patent: *Nov. 16, 2010

(54) METHOD FOR PRODUCING BITUMEN COMPOSITIONS

(75) Inventors: Everett Crews, Charleston, SC (US); Tom Girardeau, Mount Pleasant, SC (US); Iain Jack, Goose Creek, SC (US)

(73) Assignee: MeadWestvaco Packaging Systems, LLC, Richmond, VA (US)

(*) Notice: Subject to any disclaimer, the term of this patent is extended or adjusted under 35 U.S.C. 154(b) by 604 days.

This patent is subject to a terminal disclaimer.

(21) Appl. No.: 11/852,696

(22) Filed: Sep. 10, 2007

(65) Prior Publication Data

US 2008/0060551 A1 Mar. 13, 2008

Related U.S. Application Data

(63) Continuation-in-part of application No. 11/735,669, filed on Apr. 16, 2007, now abandoned, which is a continuation-in-part of application No. 11/457,931, filed on Jul. 17, 2006, now abandoned, which is a continuation of application No. PCT/US2005/002916, filed on Jan. 27, 2005.

(60) Provisional application No. 60/545,713, filed on Feb. 18, 2004.

(51) Int. Cl.
C08L 95/00 (2006.01)
C09D 195/00 (2006.01)

(52) U.S. Cl. .................... 106/277; 524/60
(58) Field of Classification Search .......... 106/277; 524/60
See application file for complete search history.

(56) References Cited

U.S. PATENT DOCUMENTS

| 2,508,430 A | 5/1950 | Smith et al. |
|---|---|---|
| 3,520,709 A | 7/1970 | Mogg et al. |
| 3,728,278 A | 4/1973 | Tramelli |
| 4,008,096 A | 2/1977 | Knapp |
| 4,338,136 A | 7/1982 | Goullet et al. |
| 4,447,269 A | 5/1984 | Schreuders et al. |
| 4,450,011 A | 5/1984 | Schilling et al. |
| 4,462,840 A | 7/1984 | Schilling et al. |
| 4,464,285 A | 8/1984 | Schilling |
| 4,464,286 A | 8/1984 | Schilling |
| 4,478,642 A | 10/1984 | Schilling et al. |
| 4,494,992 A | 1/1985 | Schilling et al. |
| 4,523,957 A | 6/1985 | Graf et al. |
| 4,547,224 A | 10/1985 | Schilling |
| 4,561,901 A | 12/1985 | Schilling |
| 4,597,799 A | 7/1986 | Schilling |
| 4,676,927 A | 6/1987 | Schilling et al. |
| 4,786,720 A | 11/1988 | Schilling |
| 4,789,402 A | 12/1988 | Kostusyk et al. |
| 4,810,299 A | 3/1989 | Schilling et al. |
| 4,859,245 A | 8/1989 | Schilling et al. |
| 4,859,362 A | 8/1989 | Schilling |
| 4,861,377 A | 8/1989 | Schilling |
| 4,877,457 A | 10/1989 | Schilling et al. |
| 4,957,560 A | 9/1990 | Schilling |
| 4,976,784 A | 12/1990 | Schilling |
| 4,990,590 A | 2/1991 | Schilling |
| 4,990,591 A | 2/1991 | Schilling |
| 4,990,592 A | 2/1991 | Schilling |
| 4,995,909 A | 2/1991 | Schilling |
| 4,997,481 A | 3/1991 | Schilling |
| 5,008,382 A | 4/1991 | Schilling et al. |
| 5,019,168 A | 5/1991 | Schilling |
| 5,034,060 A | 7/1991 | Schilling et al. |
| 5,073,297 A | 12/1991 | Schilling |
| 5,079,362 A | 1/1992 | Schilling |
| 5,085,702 A | 2/1992 | Schilling et al. |
| 5,085,704 A | 2/1992 | Schilling et al. |
| 5,096,494 A | 3/1992 | Schilling et al. |
| 5,096,495 A | 3/1992 | Schilling et al. |
| 5,160,453 A | 11/1992 | Schilling |
| 5,178,674 A | 1/1993 | Schilling et al. |
| 5,256,195 A | 10/1993 | Redelius |
| 5,320,671 A | 6/1994 | Schilling |
| 5,328,505 A | 7/1994 | Schilling |
| 5,336,438 A | 8/1994 | Schilling et al. |

(Continued)

FOREIGN PATENT DOCUMENTS

EP 1291391 11/2006

(Continued)

Primary Examiner—David M Brunsman
(74) Attorney, Agent, or Firm—MWV Intellectual Property Group

(57) ABSTRACT

The present invention relates to bituminous compositions suitable for use in paving applications containing bitumen emulsion of performance-grade bitumen that is substantially free of volatile solvents and made by controlling temperature-dependent interfacial rheology through the use of selected emulsifiers. The invention bituminous paving compositions are suitable for the construction of load-bearing pavements with improved compaction to densities similar or superior to those achieved in the conventional hot mix bituminous paving compositions. Cure rate of the invention bituminous compositions is higher than those of cold mix bitumen emulsion-based paving compositions, and at least equal to those of hot mix bituminous paving compositions. Additionally, the invention bituminous compositions develop adhesive strength and load-bearing strength properties at rates comparable to those of hot mix bituminous paving compositions, and at rates faster than those of cold mix bituminous paving compositions.

24 Claims, 3 Drawing Sheets

U.S. PATENT DOCUMENTS

| | | |
|---|---|---|
| 5,443,632 A | 8/1995 | Schilling |
| 5,596,032 A | 1/1997 | Schilling et al. |
| 5,667,578 A | 9/1997 | Schilling |
| 5,668,197 A | 9/1997 | Schilling |
| 5,670,562 A | 9/1997 | Schilling |
| 5,743,950 A | 4/1998 | Hendriks et al. |
| 5,772,749 A | 6/1998 | Schilling et al. |
| 5,776,234 A | 7/1998 | Schilling |
| 5,849,070 A | 12/1998 | Chambard et al. |
| 6,077,888 A | 6/2000 | Schilling |
| 6,106,604 A | 8/2000 | Durand et al. |
| 6,143,812 A | 11/2000 | Martin et al. |
| 7,297,204 B2 * | 11/2007 | Crews et al. ................ 106/277 |
| 2002/0058734 A1 | 5/2002 | Harlan |
| 2002/0170464 A1 | 11/2002 | Larsen et al. |
| 2005/0135879 A1 | 6/2005 | Grubba et al. |
| 2006/0236614 A1 | 10/2006 | Antoine et al. |
| 2006/0240185 A1 | 10/2006 | Antoine et al. |
| 2007/0060676 A1 | 3/2007 | Reinke |
| 2007/0191514 A1 | 8/2007 | Reinke |
| 2008/0194738 A1 * | 8/2008 | Crews et al. .................. 524/60 |

FOREIGN PATENT DOCUMENTS

| | | |
|---|---|---|
| EP | 1717369 | 11/2006 |
| EP | 1398351 | 6/2007 |
| JP | 60-168759 | 9/1985 |
| JP | 02-020626 | 1/2002 |
| RU | 2194062 | 7/2001 |
| WO | WO 92/19683 | 11/1992 |
| WO | WO 2005 081775 | 9/2005 |
| WO | WO2006106222 | 10/2006 |
| WO | WO2007032915 | 3/2007 |

* cited by examiner

METHOD FOR PRODUCING BITUMEN COMPOSITIONS

This patent application is a continuation-in-part of commonly assigned U.S. application Ser. No. 11/735,669, filed Apr. 16, 2007, now abandoned which is a continuation-in-part of U.S. application Ser. No. 11/457,931, filed on Jul. 17, 2006, now abandoned which is a continuation of PCT application No. PCT/US2005/002916, filed Jan. 27, 2005, which claims priority from U.S. Provisional Application Ser. No. 60/545,713 filed Feb. 18, 2004.

BACKGROUND OF THE INVENTION

Cold mix paving compositions are made by mixing bitumen emulsion with aggregate at ambient temperature (i.e., temperature less than about 40° C.). However, certain problems have traditionally been associated with the use of such compositions where no solvent is present. For example, when one employs a slow-setting bitumen emulsion in the construction of load-bearing pavements the pavement is slow to cure and develop sufficient strength values adequate to support heavy traffic and to resist moisture damage. However, the use of a quick-setting bitumen emulsion often leads to premature breaking of the emulsion during handling and compaction (resulting in the formation of high air voids).

Various methods have been employed in attempts to accelerate the strength development of asphalt cold mixes made with bitumen emulsions. A number of these methods rely principally on shifting the pH of the emulsion or of the entire system in order to initiate or accelerate the break and coalescence of emulsion. U.S. Pat. No. 4,008,096 to Knapp (which is hereby incorporated by reference) is exemplary of this approach, teaching the injection of pH-shifting agents to initiate the coalescence of the emulsion.

However, these methods can suffer from a lack of control of the timing of the pH-shifting chemistry. In any construction process involving bitumen emulsions, the premature breaking or coalescence of the bitumen emulsions adversely affects performance in production, handling, transport, and other end-use application operations. Prematurely broken emulsion often fails to adequately coat aggregate and generally results in high-viscosity bitumen-aggregate mixtures which can be troublesome to discharge from trucks, may excessively stick to paving equipment, and which can be difficult to compact to required pavement densities. Thus, the failure to effectively control the timing of the pH-shifting chemistry commonly leads to premature rupture of the bitumen emulsion and a cascade of undesirable effects on mix processing and pavement applications.

Attempts have been made to control of the initiation of pH-shifting chemistries in bitumen emulsions. U.S. Pat. No. 5,256,195 teaches the use of anionic water-in-oil emulsion emulsions containing breaking agents in the aqueous phase, in combination with slow-setting cationic emulsions as the main mixing and coating emulsion. Upon mechanical action of compaction the water-in-oil emulsion ruptures to expose the alkaline aqueous phase to the cationic mixing emulsion, thereby shifting the pH of the system and initiating emulsion break. Those skilled in the art recognize that the use of mineral oils and other solvents (i.e., so-called "cutter stocks") can lead to improvements in compactability. However, the use of cutter stocks can also result in decreases in the early compressive strength of compacted pavement. Dosages of cutter stocks as little as 0.1% by weight of the emulsion often decreases the compacted pavement compressive strength until such time as the cutter stock has evaporated into the atmosphere.

The formulation and production of fast-breaking bituminous emulsions by the use of rapid-setting (or spray-grade) or quick-setting emulsifiers is generally known, as disclosed in U.S. Pat. No. 4,338,136. However, approaches of this nature suffer from two drawbacks which make them unsuitable for construction of load-bearing asphalt pavements that exhibit complete aggregate coating, compact to required densities in the field, and develop strength rapidly. First, at ambient temperatures rapid-setting emulsions do not adequately coat dense-graded aggregates commonly used in construction of dense-graded, load-bearing pavements, since such rapid-setting emulsions tend to break immediately upon contact with mineral aggregate surfaces. The term "rapid-setting" is a defining characteristic of such emulsions (i.e., they immediately rupture and liberate water upon contact with mineral aggregate). Second, at ambient temperatures the immediate break of a rapid-setting emulsion produces a mix with high viscosity. The failure to adequately compact leads to low density pavements which fail under traffic due to deformation, disintegration, and/or, pot-hole formation (as water passes through the low density layer into the base where supporting pavement layers are degraded).

U.S. Pat. No. 5,743,950 discloses a process for preparing a bituminous composition by adding a hard bitumen binder having a penetration of less than 50 to a mixture of aggregates and a non-emulsified soft bitumen binder component. A hard binder component is defined as a binder component having a penetration of less than 200, as measured by ASTM D5 at 25° C. A soft binder component is defined as a binder component having a penetration of more than 700 as measured by ASTM D5 at 25° C. or a viscosity of less than 300 mPa·s. To obtain a bituminous composition with desired workability for load-bearing applications, an aggregate must be completely coated (i.e. mixed) with a soft binder prior to an addition of a hard binder. The bituminous composition must include both a hard bitumen binder and a soft bitumen binder. First, an aggregate is mixed with the soft bitumen to ensure a complete surface coating with the soft bitumen. Then, a hard bitumen is added to a mixture of aggregates and soft bitumen (i.e., aggregates surface coated with the soft bitumen) to impart stiffness and other desired properties for load-bearing applications. The hard bitumen may be added either in a form of powder or emulsion to mixture of a soft binder and an aggregate, namely an aggregated must be pretreated with a soft binder prior to a mixing with a hard binder. This process of producing bituminous composition requires a pretreatment of aggregate with soft binder prior to mixing with a hard binder; therefore, the equipment and process used to produce the bituminous composition must be designed to allow a pretreatment of aggregate.

Quick-setting emulsions are not suitable for the production of load-bearing asphalt pavement compositions at ambient temperatures for similar reasons. The use of large volumes of water beyond that present in the emulsion to promote coating of aggregate with quick-setting emulsions is not a feasible technique in the production of load-bearing pavements. First, load-bearing pavements are much thicker than the previously-mentioned slurry seal coatings and micro-surfacings. The thicker load-bearing pavements must be compacted to densify the mixture, as insufficient density can lead to rapid failure of load-bearing pavements due to deformation, disintegration, and pot-hole formation. Large water volumes prevent compaction in thick, load-bearing pavements to required densities because water is incompressible. Moreover, quick-setting emulsions develop high viscosity when stressed by high shear rate events such as compaction. As disclosed in U.S. Pat. Nos. 4,462,840 and 5,085,704, retarders are generally needed to slow down the break of quick-setting emulsion systems so that the materials might be handled and placed upon the intended construction surface prior to the development of such cohesive strength that they do not flow or cannot be spread.

Slow-setting emulsifiers are commonly employed in the production at ambient-temperature of emulsion-based road paving compositions for load bearing pavements. Slow-setting emulsifiers produce bituminous emulsions which require little or no water to achieve complete coating of the aggregate surface. Moreover, the slow-setting nature of the emulsion yields a road paving composition with a controlled coalescence rate, so that the road paving mixture does not increase in viscosity to a point that it is unsuitable for handling, hauling, or compaction. With highly dense, high-fines aggregate gradations, slow-setting emulsions do not break either prior to or during compaction, thereby rendering the mixture easy to compact at ambient temperatures. However, pavement compositions made at ambient-temperature with slow-setting bituminous emulsions are very slow to develop adhesion and cure to strengths sufficient to bear the stress of heavy traffic.

In contrast to cold mix paving compositions, hot mix paving compositions do not contain bitumen emulsions, but are instead produced by mixing non-emulsified bitumen with aggregate at elevated temperatures (usually in excess of 140° C.). The two most common hot mix facilities, drum mix plants and batch plants, heat aggregate in a rotating kiln to extremely high temperatures to drive off all water adsorbed to the aggregate, as well as all water absorbed within the surface pores of the aggregate. Quantitative removal of water is required (1) to ensure complete aggregates coatings, and (2) to ensure that the finished hot mixture of aggregate and bitumen shows no moisture sensitivity in the finished pavement layer once it is transported, laid down, and compacted.

Hot, dry aggregate produced in conventional hot mix operations is mixed with bitumen (which is previously liquefied by heating to temperatures far in excess of its melting point) to produce what is known in the industry as the "hot mix asphalt." Hot mix asphalts generally must be produced, laid down, and compacted at temperatures in excess of about 160° C., as the compactability of the hot mix asphalt depends on the temperature. If the mix cools, the asphalt viscosity increases and the mixture cannot be compacted to the design density (known as percent air voids). When a hot asphalt-aggregate mixture cools to temperatures below about 85° C., the handling, placement, and compaction of the mixture become extremely difficult and design densities (air voids) cannot be realized.

Therefore, it is an object of the present invention to disclose a method of producing bituminous compositions.

It is another object of the present invention to provide bituminous compositions suitable for use in paving applications that are substantially free of volatile solvents.

It is yet another object of the present invention is to provide bituminous paving compositions that exhibit substantially complete aggregate coating and compactability to required densities in the field.

It is a further object of the present invention is to provide bituminous paving compositions that develop adhesive strength and load-bearing strength properties at rates comparable to traditional hot-mix paving compositions, and at rates faster than traditional cold-mix paving compositions.

It is still a further object of the present invention is to provide bituminous compositions that can be applied the surface being paved at temperatures lower than those required for conventional hot-mix bituminous compositions.

Other objects, features and advantages of the present invention will be set forth in part in the description which follows, and in part will be obvious from the description or may be learned by practice of the invention.

SUMMARY OF THE INVENTION

The objects of this invention are met by a method for producing bituminous compositions suitable for use in paving applications, made by controlling temperature-dependent interfacial rheology in a broad range of solvent-free, high-residue bitumen emulsions containing performance-graded bitumen. The solvent-free bitumen emulsions used in the invention paving compositions contains emulsifiers having structural attributes that impart low interfacial viscosity, low Marangoni effect, and high interfacial bitumen solubility at elevated temperatures. The invention paving compositions have improved control of interfacial stability and rheology at a higher temperature than that of ambient cold mix technologies, but a lower temperature than that of hot mix technologies; thereby providing improved densification and accelerated strength development in the compacted state when used for load-bearing road pavement.

This invention teaches the formulation of solvent-free bitumen emulsions made of performance-graded bitumens that exhibit controllable, temperature-dependent interfacial rheology, and fully coat aggregate. Consequently, the invention bituminous paving compositions are suitable for the construction of load-bearing pavements with improved compaction to densities similar or superior to those achieved in the conventional hot mix bituminous paving compositions. Cure rate of the invention bituminous compositions is higher than those of cold mix bitumen emulsion-based paving compositions, and at least equal to those of hot mix bituminous paving compositions. Additionally, the invention bituminous compositions develop adhesive strength and load-bearing strength properties at rates comparable to those of hot mix bituminous paving compositions, and at rates faster than those of cold mix bituminous paving compositions.

DETAILED DESCRIPTION OF THE INVENTION

Figure 1:
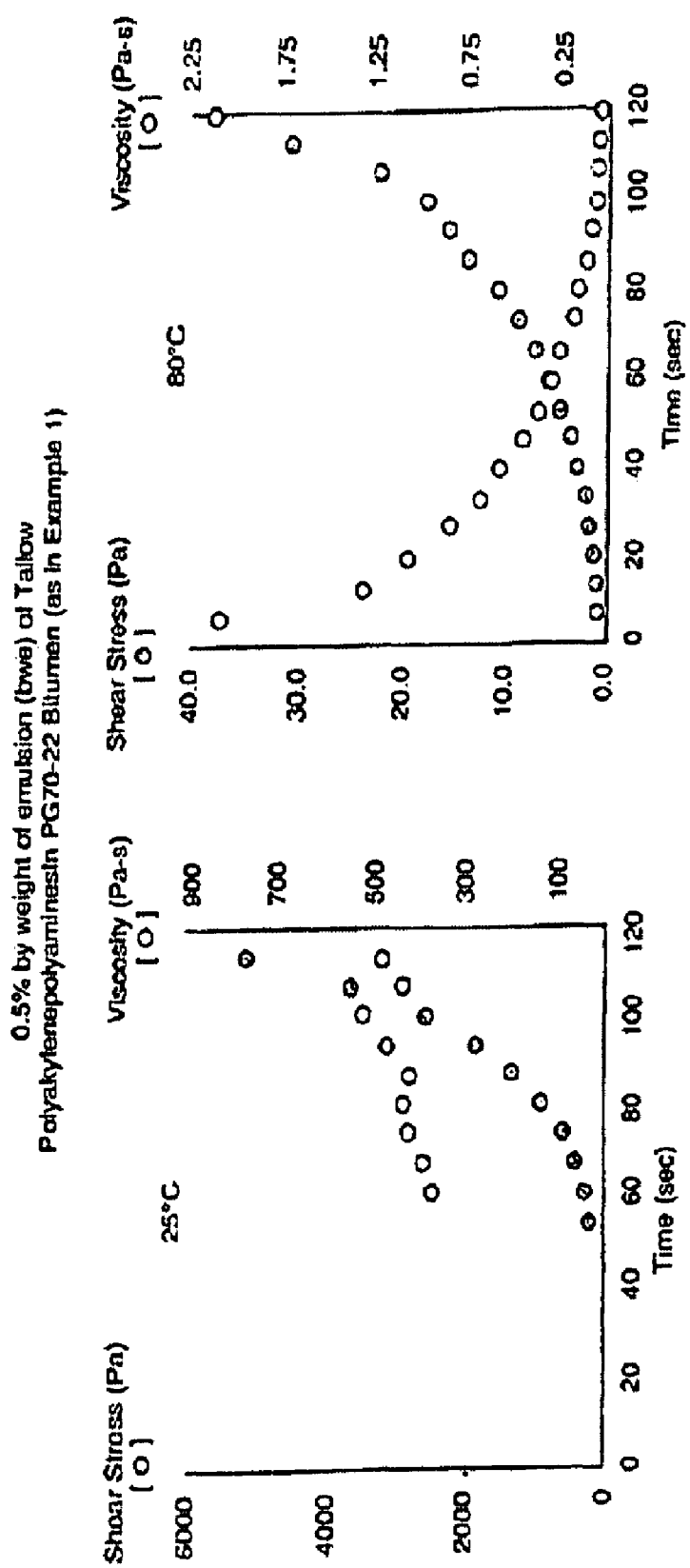
FIG. 1 shows the shear stress evaluation of a solvent-free bitumen emulsion produced in Example 1 containing 0.5% by total weight of bitumen emulsion (bwe) of emulsifier (tallow polyalkylenepolyamines) at 60% residue of PG70-22 bitumen.

The present inventions now will be described more fully hereinafter, but not all embodiments of the invention are shown. Indeed, these inventions may be embodied in many different forms and should not be construed as limited to the embodiments set forth herein; rather, these embodiments are provided so that this disclosure will satisfy applicable legal requirements.

The terms "bitumen" or "bituminous" in the present invention refer to naturally-occurring bitumen and modified bitumen. They are also known as "asphalt."

The bituminous compositions of the present invention comprise bitumen emulsion and aggregate, but in an absence of bitumen having a penetration number, as determined according to an ASTM standard method D5 at 25° C., of more than 220 dmm. It is to be understood that the "aggregate" in the present invention also includes reclaimed asphalt pavement (RAP). The bitumen emulsion is solvent-free and contains bitumen, water, and an emulsifier or combination of emulsifiers having structural attributes that impart low interfacial viscosity, low Marangoni effect, and high interfacial bitumen solubility at a temperature range of about 60° C. to about 120° C. to improve interfacial stability and rheology of the emulsions.

Any known bitumen met specifications of performance grade, viscosity grade, or penetration graded may be used in the present invention. Suitable aggregates for use in the present invention have properties met specifications established by the appropriate transportation authorities as suitable for use in construction of load-bearing pavements.

The bituminous compositions of the present disclosure do not require a pretreatment of aggregation with soft bitumen prior to mixing with bitumen emulsion.

In one embodiment of the present invention, the bituminous paving composition comprises:
(i) solvent-free bitumen emulsion in an amount of from about 2% to about 10% by total weight of the bituminous composition, wherein the emulsion comprises:
  (a) bitumen in an amount of from about 50% to about 75% by total weight of the emulsion,
  (b) emulsifier package having an interfacial tension between the bitumen and water of less than 40 dynes/cm at a temperature of 26° C. and at an aqueous concentration of less than 0.1% weight, in an amount from about 0.05% to about 2% by total weight of the emulsion,
  (c) water in an amount to complete the emulsion; and
(ii) aggregate and/or reclaimed asphalt pavement in an amount of from about 90% to about 98% by total weight of the bituminous composition;

wherein the bituminous composition is in an absence of bitumen having a penetration number of more than 220 dmm as determined according to an ASTM standard method D5 at 25° C.

In one embodiment of the present invention, the bituminous paving composition comprises:
(i) solvent-free bitumen emulsion in an amount of from about 2% to about 10% by total weight of the bituminous composition, wherein the emulsion comprises:
  (a) bitumen in an amount of from about 60% to about 70% by total weight of the emulsion,
  (b) emulsifier package having an interfacial tension between the bitumen and water of less than 40 dynes/cm at a temperature of 26° C. and at an aqueous concentration of less than 0.1% weight, in an amount from about 0.05% to about 2% by total weight of the emulsion,
  (c) water in an amount to complete the emulsion; and
(ii) aggregate and/or reclaimed asphalt pavement from about 90% to about 98% by total weight of the bituminous composition;

wherein the bituminous composition is in an absence of bitumen having a penetration number of more than 220 dmm as determined according to an ASTM standard method D5 at 25° C.

In one embodiment of the present invention, the bituminous paving composition comprises:
(i) solvent-free bitumen emulsion in an amount of from about 2% to about 10% by total weight of the bituminous composition, wherein the emulsion comprises:
  (a) bitumen in an amount of from about 50% to about 75% by total weight of the emulsion,
  (b) emulsifier package having an interfacial tension between the bitumen and water of less than 40 dynes/cm at a temperature of 26° C. and at an aqueous concentration of less than 0.1% weight, in an amount from about 0.08% to about 0.5% by total weight of the emulsion,
  (c) water in an amount to complete the emulsion; and
(ii) aggregate and/or reclaimed asphalt pavement from about 90% to about 98% by total weight of the bituminous composition;

wherein the bituminous composition is in an absence of bitumen having a penetration number of more than 220 dmm as determined according to an ASTM standard method D5 at 25° C.

In one embodiment of the present invention, the bituminous paving composition comprises:
(i) solvent-free bitumen emulsion in an amount of from about 2% to about 10% by total weight of the bituminous composition, wherein the emulsion comprises:
  (a) bitumen in an amount of from about 50% to about 75% by total weight of the emulsion,
  (b) emulsifier package having an interfacial tension between the bitumen and water of less than 40 dynes/cm at a temperature of 26° C. and at an aqueous concentration of less than 0.1% weight, in an amount from about 0.1% to about 0.75% by total weight of the emulsion, and
  (c) water in an amount to complete the emulsion; and
(ii) aggregate and/or reclaimed asphalt pavement from about 90% to about 98% by total weight of the bituminous;

wherein the bituminous composition is in an absence of bitumen having a penetration number of more than 220 dmm as determined according to an ASTM standard method D5 at 25° C.

In one embodiment of the present invention, the bitumen emulsion comprises at least one bitumen having a penetration number, as determined according to an ASTM standard method D5 at 25° C., of no more than 220 dmm.

Bitumen

Suitable bitumens for use in the present invention may be bitumen, modified bitumen, and combinations thereof. As used herein, the "bitumen" and "modified bitumen" are those which exhibit rheological properties that are appropriate for paving applications under specific climatic conditions, such as those which conform to the Strategic Highway Research Program (SHRP) pavement binder specifications. Furthermore, the bitumens may conform to specifications of viscosity-graded and/or penetration-graded bitumens.

Suitable bitumens for use in the present invention include, but are not limited to, naturally occurring bitumens such as lake asphalt, lake asphalt derivatives, gilsonite and gilsonite derivatives; bitumens derived from crude oil; petroleum pitches obtained from a cracking process; coal tar; and combinations thereof. Additionally, bitumens suitable for use in the present invention may contain recycled crumb rubber from recycled tires. It is to be understood that bitumen or bituminous may also be known as asphalt.

Suitable modified bitumens for the present invention may comprise any additives known in the production of modified bitumen having properties met the performance-grade standards. These additives may include, but are not limited to, natural rubbers, synthetic rubbers, plastomers, thermoplastic resins, thermosetting resins, elastomers, and combinations thereof. Examples of these additives include, but are not limited to, styrene-butadiene-styrene (SBS), styrene-butadiene-rubber (SBR), polyisoprene, polybutylene, butadiene-styrene rubber, vinyl polymer, ethylene vinyl acetate, ethylene vinyl acetate derivative and the like.

In one embodiment of the present invention, the modified bitumen comprises at least one additive selected from the group consisting of styrene-butadiene-styrene; styrene-butadiene-rubber; sulfur-containing crosslinker; acid modifier such as tall oil acid, tall oil pitch and phosphoric acid derivative; and combinations thereof. It is well within the ability of a skilled artisan to produce modified bitumen containing the noted additives.

Where desired, the modified bitumen may comprise additional additives traditionally employed in the production of bitumen emulsions to adjust the characteristics of the finished bituminous paving compositions. Such additional additives include, but are not limited to, styrene-butadiene-rubber latex; polyisoprene latex; neoprene; associative thickener; starch; salt; acid modifier such as polyphosphoric acid, crude tall oil, distilled tall oil acids, tall oil pitch and derivative thereof; wax modifier such as Montan wax, beeswax and Fisher-Tropsch waxes; and combinations thereof.

Surfactant

Surfactants used in the present invention may be cationic types, amphoteric types, nonionic types, and combinations thereof.

Bitumen emulsions are of the oil-in-water type; they consist of a suspension of bitumen particles dispersed in the water phase. These particles have, in the case of cationic emulsions, a positive charge. The pH of cationic emulsions is below pH 7.0. Anionic bitumen emulsions are analogous to cationic bitumen emulsions, differing only in the charge of the dispersed phase particulates, which is negative. The pH of anionic emulsions is above pH 7.0. As the term implies, amphoteric emulsifiers are characterized by the capacity to lower interfacial tensions between dissimilar materials (e.g., bitumen and water) at pH values both above and below 7.0. The charge of the disperse-phase oil droplets in amphoteric emulsions may be either positive or negative. It is well within the ability of those skilled in the art to combine the bitumen and the emulsifiers taught herein to prepare the solvent-free bitumen emulsions of the present invention.

Suitable anionic emulsifiers include, but are not limited to, saturated C-12 to C-24 fatty acid; unsaturated C-12 to C-24 fatty acid; unsaturated C-12 to C-24 fatty acid modified with acrylic acid, maleic anhydride, fumaric acid, diene, or dieneophile; rosin acid; rosin acid modified with acrylic acid, maleic anhydride, fumaric acid, diene or dieneophile; natural resinous polymer such as VINSOL® a natural resin extracted from pinewood stumps commercially available from Hercules Inc.; quebracho resin; tannin; lignous polymer such as tall oil lignin and the like; polyacrylic acid; polyacrylate derivative; alkyl sulfonate; alkyl benzyl sulfonate; alkyl sulfate; alkyl phosphonate; alkyl phosphate; phenolic resin; and combinations thereof.

As used herein, the term "anionic emulsifiers" includes the above-noted compounds and their derivatives. These include, but are not limited to, complex, addition product, and condensation product formed by a reaction of (i) at least one member selected from the group consisting of natural resinous polymer such as VINSOL® a natural resin extracted from pinewood stumps commercially available from Hercules Inc., quebracho resin, tannins and lignin; and (ii) at least one member selected from the group consisting of saturated C10-C24 fatty acid, unsaturated C10-C24 fatty acid, and unsaturated C10-C24 fatty acid modified with at least one member selected from the group consisting of acrylic acid, maleic anhydride, fumaric acid, dienes and dienophile.

Sulfate, sulfonate, phosphate, or phosphonate derivatives of the aforementioned compounds are suitable for use in the present invention including, but are not limited to, those of lignin, natural resinous polymer such as VINSOL® a natural resin extracted from pinewood stumps commercially available from Hercules Inc., quebracho resin, and tannin. Sulfate, sulfonate, phosphate, or phosphonate derivatives of the complex, addition product, or condensation product formed by a reaction of (i) at least one member selected from the group consisting of natural resinous polymer, Vinsol resin, quebracho resin, tannins and lignin; and (ii) at least one member selected from the group consisting of saturated C10-C24 fatty acid, unsaturated C10-C24 fatty acid, and unsaturated C10-C24 fatty acid modified with at least one member selected from the group consisting of acrylic acid, maleic anhydride, fumaric acid, diene and dienophile may also be used in the present invention.

As used herein the term "amphoteric emulsifiers" includes both mono-amphoteric and polyamphoteric emulsifiers. Amphoteric emulsifiers suitable for use in the present invention may be products obtained by (i) modifying at least one member selected from the group consisting of C-12 to C-24 fatty acids and rosin acid with at least one member selected from the group consisting of acrylic acid, maleic anhydride, fumaric acid, diene and dieneophile; and then (ii) reacting the resulting modified products with at least one member selected from the group consisting of polyethylene polyamine, lithium C-12 to C-24 alkyl amidopropyl halide methyl carboxylate betaine, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines.

Cationic emulsifiers suitable for use in the present invention may include, but are not limited to, fatty imidazolines derived from C-12 to C-24 fatty acids; fatty imidoamines derived from (i) modifying at least one member selected from the group consisting of C-12 to C-24 fatty acids and rosin acid with at least one member selected from the group consisting of acrylic acid, maleic anhydride, fumaric acid, diene and dieneophile, and then (ii) reacting the resulting modified products with polyalkylenepolyamines; fatty amidoamines derived from (i) modifying at least one member selected from the group consisting of C-12 to C-24 fatty acids and rosin acid with at least one member selected from the group consisting of acrylic acid, maleic anhydride, fumaric acid, diene and dieneophile, and then (ii) reacting the resulting modified products with at least one member selected from the group consisting of polyalkylenepolyamines, saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines; polyoxyethylene derivatives made by modifying saturated C-12 to C-24 alkyl monoamines with at least one member selected from the group consisting of ethylene oxide and propylene oxide; polyoxyethylene derivatives made by modifying unsaturated C-12 to C-24 alkyl monoamines with at least one member selected from the group consisting of ethylene oxide and propylene oxide; polyoxyethylene derivatives made by modifying saturated C-12 to C-24 alkyl polypropylenepolyamines with at least one member selected from the group consisting of ethylene oxide and propylene oxide; polyoxyethylene derivatives made by modifying unsaturated C-12 to C-24 alkyl polypropylenepolyamines with at least one member selected from the group consisting of ethylene oxide and propylene oxide; saturated C-12 to C-24 alkyl aryl monoamines; unsaturated C-12 to C-24 alkyl aryl monoamines; saturated C-12 to C-24 alkyl aryl polypropylenepolyamines; unsaturated C-12 to C-24 alkyl aryl polypropylenepolyamines; saturated C-12 to C-24 quaternary amines; unsaturated C-12 to C-24 quaternary amines; C-12 to C-24 alkyl ether amines; C-12 to C-24 alkylether polyamines; C-12 to C-24 alkyl polypropylene polyamine N-oxide; amine derivatives of tannins; amine derivatives of phenolic resins; amine derivatives of lignins; amine-modified polyacrylates; and combinations thereof.

In one embodiment of the present invention, the cationic emulsifier may comprise a member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof.

In one embodiment of the present invention, the cationic emulsifier may be a blend of at least one member selected from the group consisting of saturated and unsaturated C-12 to C-24 alkyl monoamines, and at least one member selected from the group consisting of saturated and unsaturated C-12 to C-24 alkyl polypropylenepolyamines.

As used herein, the term "cationic emulsifiers" includes the above-noted compounds and their derivatives.

Nonionic emulsifiers which are suitable for use in the present invention include, but are not limited, to the following: alkylaryl polyethylene oxide and polypropylene oxide derivatives; polyethylene oxide derivatives of branched, linear, and cyclic alkanols, sorbitan esters, mono- and polysaccharide derivatives; polypropylene oxide derivatives of branched alkanols, linear alkanols, cyclic alkanols, sorbitan esters, monosaccharide derivatives and polysaccharide derivatives; protein stabilizers such as casein and albumin; polyethoxylated derivatives of the anionic, amphoteric, and cationic emulsifiers mentioned above; polypropoxylated derivatives of the anionic, amphoteric, and cationic emulsifiers mentioned above; and mechanical stabilizers such as the phyllosilicate bentonite and montmorillonite clays.

In one embodiment of the present invention, the emulsifier may be nonionic emulsifiers including, but not limited to, alkyl polysaccharides; alkylphenol alkoxylates such as alkylphenol ethoxylates, alkylphenol propoxylates, dialkylphenol ethoxylates, and dialkylphenol propoxylates; fatty alcohol ethoxylates such as saturated or unsaturated fatty acid ethoxylate having linear, branched, or cyclic structure; saturated or unsaturated fatty acid propoxylate having linear, branched, or cyclic structure; ethoxylates of escinoleic acid or castor oil; and propoxylates of escinoleic acid or castor oil.

In one embodiment of the present invention, the emulsifier may comprise a nonionic emulsifiers including, but are not limited to, polyethylene-polypropylene block copolymers; hydroxypoly(oxyethylene)poly(oxypropylene)poly(oxyethylene) block copolymers; 1,2-propyleneglycol ethoxylated and propoxylated; and synthetic block copolymers of ethylene oxide and propylene oxide having molecular weights exceeding 300 g/mole.

In one embodiment of the present invention, the emulsifier may be non-tallow or non-tall oil based emulsifier including, but are not limited to, decyl alcohol ethoxylates; castor oil ethoxylate; ceto-oleyl alcohol ethoxylate; ethoxylated alkanolamide; fatty alcohol alkoxylates; dinonyl phenol ethoxylate; nonyl phenol ethoxylate; sorbitan ester ethoxylate; alkyl ether sulphate; monoalkyl sulphosuccinamate; alkyl phenol ether sulphate; fatty alcohol sulphate; di-alkyl sulphosuccinate; alkyl ether phosphate; alkyl phenol ether phosphate; alkyl naphthalene sulphonate; α-olefin sulphonate; alkyl benzene sulphonic acids and salt; alkyl ampho(di)acetate; alkyl betaine; alkyl polysaccharide; alkylamine ethoxylate; amine oxide; combinations thereof.

Oligomers, co-oligomers, ter-oligomers, tetra-oligomers, polymers, copolymers, terpolymers, or tetrapolymers of acrylic acid, alkylacrylic acid, or alkyl esters of acrylic acid, alkyl esters of alkylacrylic acid, hydroxyalkyl esters of acrylic acid, hydroxyalkyl esters of alkylacrylic acids, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkenes, dienes, allyl alcohol, polyhyrdoxylated polyalkenes, halogenated ethylene, halogenated propylene, and/or halogenated alkylidenes are suitable for use as surfactants in the present invention. Furthermore, the lithium, sodium, potassium, magnesium, calcium, ammonium, or alkylammonium salts of the aforementioned polymers may be used as emulsifiers in the present invention. Examples of suitable dienes for use in the present invention include, but are not limited to, butadiene, cyclopentadiene, and isoprene.

In one embodiment of the present invention, the emulsifier may comprise salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of oligomers, co-oligomers, ter-oligomers, tetra-oligomers, homopolymers, copolymers, terpolymers, and tetrapolymers of acrylic acid, alkylacrylic acid, alkyl esters of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethane, propene, higher order alkene, diene, hydroxylated propene, polyhyrdoxylated polyalkenes, halogenated ethylene, halogenated propylene, and/or halogenated alkylidene. Examples of suitable dienes for use in the present invention include, but are not limited to, butadiene, cyclopentadiene, and isoprene.

In one embodiment of the present invention, the emulsifier may comprise a member selected from the group consisting of oligomeric ethyleneamines, oligomeric polypropyleneamines, hexamethylene diamine, bis-hexamethylene diamine, polyethylene polyamines, polypropylene polyamines, polyethylene/polypropylene polyamines, and higher order polyalkylene polyamines such as the distillation residues from polyalkylene polyamine manufacture.

In one embodiment of the present invention, the emulsifier may be salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of oligomeric ethyleneamines, oligomeric polypropyleneamines, hexamethylene diamine, bis-hexamethylene diamine, oligomeric aziridine, polyaziridine, polyethylene polyamines, polypropylene polyamines, polyethylene/polypropylene polyamines, and higher order polyalkylene polyamines such as the distillation residues from polyalkylene polyamine manufacture.

In one embodiment of the present invention, the emulsifier may comprise monoethoxylated, polyethoxylated, monopropylated, or polypropylated condensates of oligomeric ethyleneamines, oligomeric polypropyleneamines, hexamethylene diamine, bis-hexamethylene diamine, oligomeric aziridine, polyaziridine, polyethylene polyamines, polypropylene polyamines, and/or higher order polyalkylene polyamines such as the distillation residues from polyalkylene polyamine manufacture.

In one embodiment of the present invention, the emulsifier may comprise salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of monoethoxylated, polyethoxylated, monopropylated, and polycondensates of oligomeric ethyleneamines, oligomeric polypropyleneamines, hexamethylene diamine, bis-hexamethylene diamine, polyethylene polyamines, polypropylene polyamines, and/or higher order polyalkylene polyamines such as the distillation residues from polyalkylene polyamine manufacture.

In one embodiment of the present invention, the emulsifier may comprise hydroxyalkyl amine such as hydroxyethyl amine, hydroxyethylpolyamine, hydroxypropyl polyethylene amine, hydroxypropyl amine, hydroxypropyl polypropylene amine, and combinations thereof.

In one embodiment of the present invention, the emulsifier may comprise salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) hydroxyalkyl amine such as hydroxyethyl amine, hydroxyethylpolyamine, hydroxypropyl polyethylene amine, hydroxypropyl amine, hydroxypropyl polypropylene amine, and combinations thereof.

In one embodiment of the present invention, the emulsifier may comprise C-36 dimeric fatty acids or C-54 trimeric fatty acids. In one embodiment of the present invention, the emulsifier may comprise polymeric condensation products formed by a reaction of C-36 dimeric fatty acids with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of polymeric condensation products formed by a reaction of C-36 dimeric fatty acid with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the emulsifier may comprise polymeric condensation products formed by a reaction of C-54 trimeric fatty acids with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) polymeric condensation product formed by a reaction of C-54 trimeric fatty acids with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the emulsifier may comprise a member selected from the group consisting of hydroxystearic acid, oligomer of hydroxystearic acid, and polymeric hydroxystearic acid.

In one embodiment of the present invention, the emulsifier may comprise a member selected from the group consisting of polymeric condensation products formed by a reaction of (i) at least one member selected from the group consisting of ethylene amines, propylene amines, ethylene/propylene amines, oligomeric ethyleneamines, polyethylene polyamines, oligomeric propylene amine and higher order polyalkylene polyamines such as the distillation residues from polyalkylene polyamine manufacture; and (ii) at least one member selected from the group consisting of hydroxystearic acid, oligomers of hydroxystearic acid, and polymeric hydroxystearic acid.

In one embodiment of the present invention, the emulsifier may comprise polymeric condensation products formed by a reaction of Lewis acid base such as lithium hydroxide, sodium hydroxide, and potassium hydroxide; and at least one member selected from the group consisting of hydroxystearic acid, oligomers of hydroxystearic acid, and polymeric hydroxystearic acid.

In one embodiment of the present invention, the emulsifier may comprise ethoxytrimethyleneamine derivatives of C-12 to C-24 fatty amines of structure (I), wherein R is aliphatic C-12 to C-24 moieties; the sum of x and y is greater or equal to two; and a and b are greater than or equal to zero. The aliphatic C-12 to C-24 moieties may be saturated or unsaturated having linear, branched, or cyclic structure.

STRUCTURE (I)

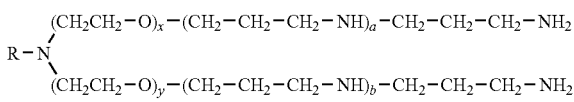

wherein,
R=saturated or unsaturated aliphatic C-12 to C-24 having linear, branched, or cyclic structure;
x+y≧2; and
a, b≧0

In one embodiment of the present invention, the emulsifier may comprise a member selected from the group consisting of salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of ethoxytrimethyleneamine derivative of C-12 to C-24 fatty amines of structure (I).

In one embodiment of the present invention, the emulsifier may comprise propoxytrimethyleneamine derivatives of C-12 to C-24 fatty amines of structure (II), wherein R is aliphatic C-12 to C-24 moieties; the sum of x and y is greater or equal to two; and a and b are greater than or equal to zero. The aliphatic C-12 to C-24 moieties may be saturated or unsaturated having linear, branched, or cyclic structure.

STRUCTURE (II)

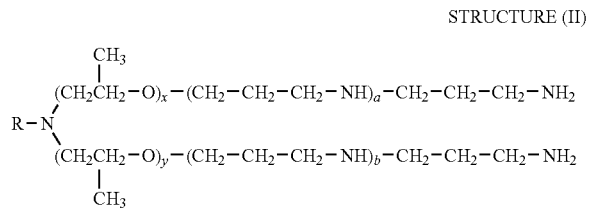

wherein,
R=saturated or unsaturated aliphatic C-12 to C-24 having linear, branched, or cyclic structure;
$x+y \geq 2$; and
$a, b \geq 0$ In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of propoxytrimethyleneamine derivative of C-12 to C-24 fatty amines of structure (II).

In one embodiment of the present invention, the emulsifier may comprise a member selected from the group consisting of saturated aliphatic C-12 to C-24 dialkyl amines having linear, branched, or cyclic structure; and unsaturated aliphatic C-12 to C-24 dialkyl amines having linear, branched, or cyclic structure of structure (III), wherein $R^1$ and $R^2$ may be the same or different; and each may be saturated or unsaturated aliphatic C-12 to C-24 moieties having linear, branched, or cyclic structure.

STRUCTURE (III)

wherein,
$R^1$, $R^2$=saturated or unsaturated C-12 to C-24 moieties having linear, branched, or cyclic structure In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of saturated and unsaturated aliphatic C-12 to C-24 dialkyl amines of structure (III).

In one embodiment of the present invention, the emulsifier may comprise quaternary amine derivative of at least one member selected from the group consisting of linear, branched, or cyclic saturated aliphatic C-12 to C-24 alkyl amines; and linear, branched, or cyclic saturated aliphatic C-12 to C-24 alkyl amines of structure (IV), wherein $R^1$ and $R^2$ may be the same or different saturated and unsaturated linear, branched, and cyclic aliphatic C-12 to C-24 moieties, and $R^3$ and $R^4$ may be methyl moieties or other higher order homologs of saturated or unsaturated linear, branched, and cyclic aliphatic moieties.

STRUCTURE (IV)

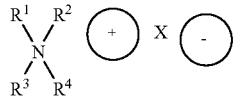

wherein,
$R^1$, $R^2$=saturated or unsaturated aliphatic C-12 to C-24 moieties having linear, branched, or cyclic structure; and
$R^3$, $R^4$=methyl or higher order homologs of saturated or unsaturated aliphatic C-12 to C-24 moieties having linear, branched, or cyclic structure In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of quaternary amine derivative of saturated or unsaturated aliphatic C-12 to C-24 alkyl amines of structure (IV).

In one embodiment of the present invention, the emulsifier may comprise quaternary amine derivative of at least one member selected from the group consisting of linear, branched, or cyclic saturated aliphatic C-12 to C-24 alkyl amine; and linear, branched, or cyclic saturated aliphatic C-12 to C-24 alkyl amine of structure (V), wherein $R^1$ and $R^2$ may be the same or different linear, branched, and cyclic saturated or unsaturated aliphatic C-12 to C-24 moieties; and $R^3$ and $R^4$ are ethoxy or propoxy moieties and combinations thereof.

STRUCTURE (V)

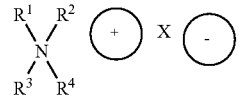

wherein,
$R^1$, $R^2$=saturated or unsaturated aliphatic C-12 to C-24 moieties having linear, branched, and cyclic structure; and
$R^3$, $R^4$=ethoxy moieties, propoxy moieties, or combinations thereof.

In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of quaternary amine derivative of saturated or unsaturated aliphatic C-12 to C-24 alkyl amines of structure (V).

In one embodiment of the present invention, the emulsifier may comprise bisamide formed by a reaction of polyalkylenepolyamines and adduct obtained by modifying at least one member selected from the group consisting of linear, branched, or cyclic saturated aliphatic C-12 to C-24 fatty acid; and linear, branched, or cyclic saturated aliphatic C-12 to C-24 fatty acids with at least one member selected from the group consisting of acrylic acid, maleic anhydride, fumaric acid, diene and dieneophile.

In one embodiment of the present invention, the emulsifier may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) bisamide formed by a reaction of polyalkylenepolyamines and adduct obtained by modifying at least one member selected from the group consisting of linear, branched, or cyclic saturated aliphatic C-12 to C-24 fatty acid; and linear, branched, or cyclic saturated aliphatic C-12 to C-24 fatty acids with at least one member selected from the group consisting of acrylic acid, maleic anhydride, fumaric acid, diene and dieneophile.

In one embodiment of the present invention, the emulsifier may comprise dialkylarylamine. In one embodiment of the present invention, the emulsifier may comprise salt obtained by a reaction of dilakylarylamine and at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid.

Suitable emulsifiers for use in the present invention not only convey high-temperature shear-stability needed for mixing and subsequent compacting of the bituminous compositions, but also impart a high viscosity to the bitumen emulsion so that no thickener is needed for emulsion stability or for increased film coating on the aggregate, and lower an interfacial tension between the bitumen film and aggregate so that a strong adhesive bond is maintained and water damage to the pavement is prevented.

Emulsifier formulations are chosen to control emulsion properties such as interfacial viscosity, Marangoni effect, and interfacial bitumen solubility at the elevated temperature of the present invention and concurrently at low emulsifier dosages. Surfactant dosages likewise are chosen to impart the target interfacial properties in the finished emulsion. High emulsifier dosages are avoided because they are costly. Furthermore, high emulsifier dosages contribute to low rates of compressive strength development, and increase moisture sensitivity in the finished pavement.

In one embodiment, the emulsifier package used in the bitumen emulsion has an interfacial tension between bitumen and water of less than 40 dynes/cm at 26° C. and at an aqueous concentration of less than 0.1% weight.

In one embodiment, the emulsifier package has an interfacial tension between bitumen and water of less than 30 dynes/cm at 26° C. and at an aqueous concentration of less than 0.1% weight.

In one embodiment, the emulsifier package has an interfacial tension between bitumen and water of less than 20 dynes/cm at 26° C. and at an aqueous concentration of less than 0.1% weight.

In one embodiment, the emulsifier package has an interfacial tension between bitumen and water of less than 10 dynes/cm at 26° C. and at an aqueous concentration of less than 0.1% weight.

In one embodiment, the emulsifier package has an interfacial tension between bitumen and water of less than 5 dynes/cm at 26° C. and at an aqueous concentration of less than 0.1% weight.

The bitumen emulsion of the present invention may be produced using several mixing techniques. The emulsion may be a produced using a high shear mixer, commonly having a shear rate of above 1,200 rpm. In one embodiment, the emulsion is produced using a high shear mixing process at a shear rate of 4,000 rpm. These mixing process include, but are not limited to, mixing the bitumen and water using the following types of mixing equipment: high-shear colloid mills, static in-line mixers, high-shear mixers, and high-shear nozzle devices. Furthermore, the emulsion may be produced by directly injecting water into a process stream of bitumen in such that the shear generated from the water injection sufficiently disperses and mixes water droplets into the bitumen stream and provides bitumen emulsion. The injection of the water into a bitumen process stream may be performed through phase inversion process such as catastrophic or otherwise.

The bitumen emulsion of the present invention may be solvent-free. Environmental concerns have driven the reduction, up to elimination, of organic solvents from paving bitumen emulsions. However, for technological reasons total elimination has not been available in all paving applications prior to the availability of the present invention. In certain districts the term "solvent-free" is defined to include a minor portion of organic solvents. For example, "solvent-free" has at one time been defined in the state of Pennsylvania to include up to 4% organic solvents. For the purposes of this invention, therefore, where desired the water-in-bitumen emulsion may contain at least one solvent (such as naphtha, kerosene, diesel, flux, and the like) at a level less than that needed to facilitate either: 1) the mixing of the bituminous composition at ambient temperature to yield fully-coated aggregate, or 2) the compaction of the bituminous composition at ambient temperatures. In one embodiment, the level of solvent in the invention water-in-oil bitumen emulsion is less than about 1% by total weight of the emulsion. As used herein, the term "ambient temperatures" means an environmental temperature of less than about 40° C.

Where desired, the bitumen emulsions of the present invention may be stored at temperatures in the range of about 60° C. to about 80° C. for prolonged periods of time without adversely affecting the particle size distribution of the emulsions.

Aggregate

Aggregate used in paving materials and road construction, road rehabilitation, road repair, and road maintenance are derived from natural and synthetic sources. It is to be understood that the "aggregate" in the present invention also includes reclaimed asphalt pavement (RAP). As in any construction process, aggregate are selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project. Among the aggregate properties that is key to successful road construction is gradation, which refers to the percent of aggregate particles of a given size. For most load-bearing asphalt pavements, three gradations are common: dense-graded, gap-graded, and open-graded. Dense-graded aggregate exhibit the greatest mineral surface area (per unit of aggregate). Open-graded aggregate largely consist of a single, large-sized (e.g., around 0.375 to 1.0 inch) stone with very low levels (typically less than about two percent of the total aggregate) of fines (material less than 0.25 inch) or filler (mineral material less than 0.075 mm). Gap graded aggregate fall between dense-graded and open-graded classes. Reclaimed asphalt pavement (RAP) material generally reflects the gradation of the pavement from which the recycled material was obtained. If the original pavement was a dense-graded mix, the RAP will also be dense graded, although the RAP filler fraction is generally observed to be lower than the design limits of the origin aggregate specifications.

Any aggregate which is traditionally employed in the production of bituminous paving compositions is suitable for use in the present invention. These include, but are not limited to, dense-graded aggregate, gap-graded aggregate, open-graded aggregate, stone-matrix asphalt, reclaimed asphalt pavement (RAP), reclaimed roofing shingles and mixtures thereof. Aggregate which is not fully dried may also be employed in the present invention.

Bituminous Paving Composition

In one embodiment of the present invention, the bituminous paving composition is produced at a temperature range of about 50° C. to about 140° C. by a process comprising a step of mixing:
(i) solvent-free bitumen emulsion, having a temperature from about 25° C. to about 95° C., in an amount from about 2% to about 10% by total weight of the bituminous composition; and
(ii) aggregate, having a temperature from about 60° C. to about 140° C., in an amount from about 90% to about 98% by total weight of the bituminous composition; and
wherein the bituminous composition is in an absence of bitumen having a penetration number of more than 220 dmm as determined according to an ASTM standard method D5 at 25° C.

In another embodiment, the bituminous compositions are produced by aforementioned process at a temperature in the range of about 55° C. to about 120° C.

In another embodiment, the bituminous compositions are produced by aforementioned process at a temperature in the range of about 55° C. to about 120° C.

Yet in another embodiment, the bituminous compositions are produced by aforementioned process at a temperature in the range of about 60° C. to about 80° C.

In one embodiment, the bituminous compositions are produced by aforementioned process by using the bitumen emulsion in (i) having a temperature in a range of about 60° C. to about 80° C.

In one embodiment, the bituminous compositions are produced by aforementioned process by using the aggregate in (ii) having a temperature in a range of about 60° C. to about 120° C.

The invention bituminous composition may include additives introduced with the aggregate feed. Examples of such additives include, but are not limited to, mineral additives such as lime and cement; and fibrous additives such as cellulose, glass and polymer fibers. Additionally, reclaimed asphalt pavement material may be used as additive.

In one embodiment, the invention bituminous composition is applied to the surface to be paved at a temperature range of about 0° C. to about 120° C. In another embodiment, the invention bituminous composition is applied to the surface to be paved at a temperature range of about 55° C. to about 100° C. Yet in another embodiment, the invention bituminous composition is applied to the surface to be paved at a temperature range of about 60° C. to about 80° C. It will be understood that those killed in the art that the bitumen emulsions may be mixed cold (e.g., at ambient temperature) and then heated.

Once applied to the surface to be paved, the invention bituminous compositions may be compacted as desired using any of the compaction methods known in paving applications.

In one embodiment, the applied bituminous composition is compacted to an air void content comparable to that of hot mix pavement compositions made at temperatures exceeding 140° C. and having substantially equivalent aggregate gradation and bitumen content.

In one embodiment, the applied bituminous composition is compacted to an air void content lower than that of cold mix pavement compositions made at ambient temperatures (i.e., temperatures less than about 40° C.) and having substantially equivalent aggregate gradation and bitumen content.

In one embodiment, the applied bituminous composition is compacted to develop load-bearing strength at a rate comparable to that of hot mix pavement compositions made at temperatures exceeding 140° C. and having substantially equivalent aggregate gradation and bitumen content.

In one embodiment, the applied bituminous composition is compacted to develop load-bearing strength at a faster rate than that developed by comparable cold mix pavement compositions made at ambient temperatures and having substantially equivalent aggregate gradation and bitumen content.

Strength development in the cold mix pavement compositions is a function of the development of adhesion between bitumen and aggregate. In one embodiment, the applied bituminous composition is compacted to develop adhesion between bitumen and aggregate at a faster rate than that developed by comparable cold mix pavement compositions made at ambient temperatures having substantially equivalent aggregate gradation and bitumen content.

The method of the present invention is suitable for use in thin lift overlay paving applications. Thin lift overlays is a maintenance paving technique that traditionally involves the placement of a thin lift of a bituminous composition produced according to standard hot-mix procedures at temperatures normally exceeding 165° C. and applied at corresponding temperatures in the field to an existing, damaged pavement surface. The current thin lift technology using hot-mix bituminous compositions commonly suffers from two major deficiencies. First, the hot bituminous composition tends to cool quickly, making it difficult to extend (i.e., spread) at ambient temperatures onto the existing pavement surface needed of repair. This rapid cooling of the thin lift made of hot bituminous material can also result in relatively poor compaction. The problems that arise in construction (e.g., extension, spreading and compaction) due to rapid cooling can be aggravated when polymer-modified bitumens are used. Polymer-modified bitumens have higher viscosities than unmodified bitumens at a given temperature. Thus, hot-mix bituminous compositions (mixtures with aggregate) made with polymer-modified bitumens are more viscous than equivalent bituminous compositions made with unmodified bitumen at a given construction temperature. As a result of increased viscosity and resistance to flow, a thin lift bituminous composition made with polymer-modified bitumen exhibits even greater problems in handling and construction.

Where desired, the methods and bituminous compositions of the present invention may be employed in the production of bituminous paving blocks. In this technology, water-in-oil bitumen emulsion and aggregate are mixed to form a bituminous composition that is cast in molds, compacted, and allowed to cure. The cured blocks (or bricks) are used to construct pavements.

In one embodiment, the invention bituminous composition is cast in the mold and compacted at a temperature range of about 50° C. to about 120° C. In another embodiment, the invention bituminous composition is cast in the mold and compacted at a temperature range of about 55° C. to about 100° C. In yet another embodiment, the invention bituminous composition is cast in the mold and compacted at a temperature range of about 60° C. to about 80° C.

Due to the enhanced compaction (leading to higher density and higher strength) and accelerated cure rates (leading to increased production rates and improved manufacturing economics) exhibited by the bituminous compositions of the present invention, the methods and bituminous compositions of the present invention offers improvements over the construction of these blocks using traditional cold mix paving compositions.

In one embodiment, the invention bituminous composition may be maintained at a temperature range of about 50° C. to about 120° C. for the period of time between the production of the bituminous compositions and their use in paving applications. In another embodiment, the invention bituminous composition may be maintained at a temperature range of about 55° C. to about 100° C. In yet another embodiment, the invention bituminous composition may be maintained at a temperature range of about 60° C. to about 80° C. The invention bituminous composition may be maintained at these temperatures in closed systems (such as relatively large stockpiles, storage silos, covered transport vehicles, and the like) to prevent the evaporation of moisture.

Methods and equipment known for mixing bitumen emulsion and aggregate that are stationary or mobile may be used in the production of invention bituminous paving compositions, such as pug mills of batch, drum, or continuous variety. The term "mobile" includes, but is not limited to, equipments used in-situ and in-place operations. Pug mills impart high shear to the emulsion as it is ground with coarse aggregate and/or RAP, fines, and filler. In these high shear mixers, aggregate and/or RAP (which is heated in the drum or batch mixer to the specified process temperatures) tumbles down the inclined drum while bitumen emulsion is sprayed onto the warm aggregate and/or RAP, giving emulsion-treated aggregate and/or RAP that tumbles downward through the drum mixer. The interior wall of most drum mixers is lined with vanes that repeatedly catch the mix, lift it up as the drum rotates, and deposit it back to the bottom of the drum. Drum and batch plants are capable of throughput of many hundred tons of paving material per hour. It is to be understood that any method of mixing bitumen emulsion and aggregate traditionally utilized in the production of paving compositions may be used in the present invention.

Typically, the bitumen emulsion having traditional emulsifier package is coarsened under mechanical stress imparted by mixing the emulsion with aggregate at elevated temperatures. Therefore, its efficiency in aggregate coating is reduced and the viscosity of bituminous composition making thereof increases. As the viscosity of the bituminous composition increases, the densification of paving composition during compaction deteriorates, resulting in a number of pavement distress problems such as rutting, pot-hole formation, and raveling. While the use of high emulsifier dosages can mitigate this coarsening, such dosages can also retard the development of compressive strength and yield undesirable outcome.

The rheology of the disperse-phase droplets in the invention bitumen emulsions directly influences the behavior of the emulsions when mixed at elevated temperature with heated aggregate. The rheology at the oil-water interface is, in turn, controlled by the structure and chemistry of the emulsifiers. Surfactant structure and chemistry affect the energy required to disperse the emulsifier at the interface. Surfactant structure and chemistry determine the shear stability of the oil-water droplets against coalescence under high-temperature shear conditions, such as those exhibited during mixing of emulsions and aggregate at temperatures above ambient. Surfactant structure and packing affect the interfacial fluidity or viscosity. Furthermore, proper choice of emulsifier structure affects the magnitude of the effect on the interfacial viscosity.

The observation that some chemical entities produce the desired effect of rapid early strength development, while others do not, further suggests that the chemistry of the formulation is also an influencing factor. A further observation that the bitumen emulsions which behave as desired have higher levels of shear stability than those which do not show this behavior would suggest this chemical contribution results from the emulsifier. The observation that strength development in the bituminous compositions of the present invention is associated with better compressibility than traditional cold mixes very strongly suggests that the specific physico-chemical effect is a change in the rheology of the bitumen droplets within the emulsion. The early strength development exhibited by the bituminous compositions of the present invention which is more characteristic of a hot mix than a cold mix also indicates that the rheological response of the bitumen droplets is an interfacial rather than a bulk response.

A variant of the above mechanism which is consistent with the currently available data and observations of the present invention consists of a heat dependant activation of the interfacial solubility of the ionic emulsifier. Interfacial solubility within the present context may be defined as localization of the emulsifier at the interface. No distinction should be made at the present time between surface adsorption (the emulsifier resides in the aqueous phase of the bitumen emulsion but at the interface with certain functional groups penetrating into the bitumen), penetration of the interface by the emulsifier (residing within the surface of the bitumen droplet with functional groups oriented towards the water and others oriented towards the interior of the bitumen phase of the bitumen emulsion), or complete residence within the bitumen phase of the bitumen emulsion but at the interface (the mirror image of surface adsorption).

The interactions of the emulsifier with the interfacial region of a dispersed bitumen droplet can influence the interfacial rheology of the bitumen in two ways. The emulsifier can provide a lubricity layer or slip plane between and amongst the droplets or they can disrupt the structure of the asphaltene fractions of the bitumen at and within the interface. It must be noted that the hardness and flow resistance of bitumen is to a large degree a function of the asphaltene components within particular bitumen. The model of bitumen favored by those working in the area of heavy oil processing consists of asphaltenes of varying molecular weights existing as dissolved and colloidal entities within the maltene phase of the bitumen. Penetration of the associated asphaltenes within bitumen by molecules or parts of molecules will tend to disrupt the surface structure of the bitumen. The concomitant result of this is a reduction in the resistance to flow of the surface regions of the droplets. By definition, the resistance to flow is referred to as viscosity. In order to penetrate the structure formed by the asphaltenes, a foreign molecule or parts of that molecule must have similar cohesive energy density to the asphaltenes. From a thermodynamic point of view, this means that if the molecules of two different substances have similar cohesive densities and are placed in close proximity to each other and subjected to the same conditions (such as temperature, pH, ionic strength etc.) the molecules of the two will intermingle at the level of individual molecules. This is by definition solvation or dissolution. By convention, the substance present in greater concentration is referred to as the solvent and the other, the solute.

One of the most widely accepted means of quantitatively describing the cohesive energy density is by use of a parameter called the solubility parameter. This number is actually the square root of the cohesive energy density. Various models of the solubility parameter have been proposed. The most widely referred to models are those of Hildebrand and Hansen. As a solubility class, asphaltenes have a solubility parameter ($\delta$) of 19-24 $(MPa)^{1/2}$. Consequently, a substance with a solubility parameter within or slightly above this range should in principle dissolve in and disrupt the internal structure of the asphaltenes of an asphalt. Somewhat relevant to this argument are references to the fact that London dispersion forces are the major contributors to the strength and complexity of the asphaltene structure within a given asphalt. This must be considered when using the more complex Hansen solubility parameter instead of the Hildebrand version. Further to this, it is common practice to quantify the asphaltene fraction of bitumen by precipitating the asphaltenes from a sample of that asphaltene via the addition of either pentane or heptane. These two hydrocarbons have Hildebrand solubility parameters of 14.3 and 15.1 $(MPa)^{1/2}$, respectively. Consequently, solubility parameters in the range of 19-25 $(MPa)^{1/2}$ or higher will identify molecules or parts of molecules which have the ability to disrupt asphaltene structure and consequently fluidize that bitumen, while molecules or parts of molecules with solubility parameters similar to those of the C5-C7 hydrocarbons have the potential to reflocculate or coagulate already dispersed asphaltenes.

From a molecular point of view, the cohesive energy density or solubility parameter of a molecular is determined by its chemical composition or make-up. Consequently, it is also a function of the raw materials and the manufacturing process used to manufacture that substance, or more succinctly, the nature of the specific substance. In the case of emulsifiers, the solubility parameter can also be related to the hydrophile-lipophile balance (HLB) by the expression:

$$HLB = \frac{(\delta - 16.8) \times (54)}{\delta - 12.3}$$

In the present work, a series of emulsifiers was shown to demonstrate the compressibility and early strength development seen to be an advantage of the method of the present invention. Those emulsifiers were observed to have functional groups with solubility parameters in the range of 24-25 $(MPa)^{1/2}$ and hydrophobes in the range of 8-16 $(MPa)^{1/2}$. The most dramatic failure was observed with an emulsifier system with a low level of functionality of the requisite type and solubility parameter. The solubility parameter of the entire emulsifier system was also well into the high 30's to low 40's. Additionally, the usable functionality which was present was shown by model studies to be sterically hindered from penetration into the interfacial regions of the bitumen/water interface. It is thus a preferred embodiment of the present invention to formulate the bitumen emulsions with emulsifiers comprised of functional groups and structure, which impart the requisite solubility characteristics (as described above) for controlling temperature-dependent interfacial rheology.

The following examples are provided to further illustrate the present invention and are not to be construed as limiting the invention in any manner.

In the following examples, the bituminous compositions of bitumen emulsion and aggregate were either mixed with an automated bucket mixer (Example 1) or by hand (Examples 2-14). The mixtures of bitumen emulsion and aggregate were compacted after preparation while the mixtures were at production temperatures. A Strategic Highway Research Program (SHRP) gyratory compactor (commercially available from Pine Instruments) was used to compact the bituminous compositions into pills at a gyratory angle of 1.25° and a ram pressure of 600 kPa using 30 gyrations. Immediately after compaction, the bituminous composition pills were placed in a 25° C. oven for curing. After curing, the pills were evaluated for compressive strength (i.e., Marshall stability). The compressive strength value obtained after only four hours of curing at ambient temperature (25° C.) is referred to herein as "early strength." A stabilometer (commercially available from Pine Instruments) was used to measure the compressive strength of the compacted specimens. The particle sizes of each of the bitumen emulsions employed in the following examples were less than 10 microns.

The aggregate used in the following examples was crushed granite conforming to gradation and property specifications for a dense-graded, ½-inch nominal paving mixture commonly used for production of pavement wearing courses. All aggregate samples were oven-dried (110° C.) before usage to remove moisture. In the comparative cold mix examples, the aggregate was allowed to cool to room temperature before mixing with the bituminous emulsion. In the comparative hot mix examples, the aggregate was heated to a temperature in the range of about 140° C. to 160° C. before mixing with bitumen heated to an equivalent temperature. All graded aggregate samples were 1,000 grams.

Coating was measured using a modification of the commonly known instrumental luminescence method of Deneuvillers et al. Coating values in the examples below are expressed in percentages, indicating the measured percentage of aggregate surface coated by bitumen.

Example 1

Bituminous compositions of the present invention were prepared by the following procedure. Solvent-free bitumen emulsions were prepared using one of three different emulsifiers (A, B, and C) based on alkyl polyamines at dosages ranging from 0.3% to 0.5% by total weight of the respective bitumen emulsion. Emulsifier A was a blend of 0.4% by total weight of the bitumen emulsion (bwe) of saturated and unsaturated C16-C18 tallow tripropylenetetramines and 0.1% bwe of saturated and unsaturated C16-C18 tallow monoamines. Emulsifier B was 0.3% bwe of saturated and unsaturated C16-C18 tallow polypropylenepolyamine blends. Emulsifier C was a blend of 0.45% bwe of alkyl polypropylenetetramine and 0.01%-0.05% bwe of a mixture of saturated and unsaturated C16-C18 alkyl monoamines, -diamines, and -triamines. The respective emulsifiers were dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was of Venezuelan origin and had a performance-grade of PG64-22. The bitumen was heated to 130° C. and added to the Atomix colloid mill, wherein the soap solution and bitumen mixture was processed to produce bitumen emulsion. The bitumen content of the finished bitumen emulsions were about 60-63% bwe. The bitumen emulsions were subsequently diluted with water to 53.3% bitumen content prior to mixing with aggregate.

As noted above, the aggregate used was crushed granite conforming to gradation and property specifications for ½-inch nominal wearing course paving aggregate. The aggregate as received from the quarry was oven dried to remove moisture. The dried aggregate was separated into size fractions from particles passing the 12.5-mm sieve to particles passing the 0.075 micron sieve. The fractions were combined in quantities to give an aggregate gradation conforming to the standard for ½-inch nominal, dense-graded aggregate for surface and wearing course pavements. This combination of aggregate water-free fractions meeting the ½-nominal gradation standard is referred to as the graded aggregate.

For bituminous compositions made in this example according to the method of the present invention, the graded aggregate was heated to about 80° C. in an oven while the bitumen emulsion was heated to about 60° C. About 1,000 grams of heated graded aggregate were placed in a 1-gallon stainless steel bucket, and the bucket was placed in the automatic bucket mixer. To the 1,000 grams of aggregate at 80° C. was added, with stirring, 90 g of 60° C. bitumen emulsion. The mixing was continued for an additional 60 seconds to produce bituminous compositions containing about 4.8% bitumen by total weight of the graded aggregate.

The resulting bitumen compositions (having a temperature in the range of about 60° C. to about 80° C.) were added to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°.

The resulting cold mix bitumen compositions at ambient temperature were added to a 100-mm diameter gyratory compaction mold, which was also at ambient temperature. The ambient-temperature bitumen compositions were then compacted using 30 gyrations of a SHRP Pine gyratory compactor at 600 kPa pressure and a gyration angle of 1.25°.

The compacted bitumen compositions were placed in a 25° C. oven and allowed to cure for four hours. After four hours of curing, the physical and performance properties of the compacted and cured cold mix bituminous compositions were measured.

A comparison of the respective bituminous compositions was made for three critical physical and performance properties—coating, densification, and strength development. Compacted specimens prepared by mixing and compacting emulsion and aggregate at ambient temperatures (i.e., according to traditional cold mix methods) showed substantially different physical and performance properties than those exhibited by the bituminous compositions made by the method of the present invention. These results are listed in Table 1.

As shown in Table 1, the bituminous compositions of the present invention had aggregate coating levels of 94% to 99%. The mixes gave compacted bituminous compositions (pills) with heights ranging from 62.2 to 62.7 mm after compaction, which were substantially denser than the cold mix pills. The same compacted bituminous compositions made according to the method of the present invention exhibited compressive strength (lb-f) values after storage at 25° C. four hours of 3,000-3,235 lb-f, which was substantially stronger than that exhibited by the cold mix examples. As previously mentioned, this compressive strength value, obtained after only four hours of curing at ambient temperature, is referred to herein as "early strength."

TABLE 1

| Physical or Performance Property | Method of the Present Invention | | | Cold Mix Method | | |
| --- | --- | --- | --- | --- | --- | --- |
| | Emulsifier A | Emulsifier B | Emulsifier C | Emulsifier A | Emulsifier B | Emulsifier C |
| Coating (%) | 99 | 94 | 94 | 95 | 89 | 99 |
| Specimen Height (mm) | 62.4 | 62.7 | 62.2 | 66.1 | 66.0 | 65.8 |
| Compressive Strength after 4 hours at 25° C. (lb-f) | 3000 | 3100 | 3325 | 2100 | 1460 | 2000 |

The compacted bituminous compositions were placed in a 25° C. oven and allowed to cure for four hours. After four hours of curing, the physical and performance properties of the compacted and cured bituminous compositions were measured.

For comparison purposes, a series of cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket mixer.

The emulsion from Example 1 used in the evaluations shown in FIG. 1, contains 0.5% by total weight of bitumen emulsion (bwe) of emulsifier (tallow polyalkylenepolyamines) at 60% residue of PG70-22 bitumen. The invention bitumen emulsions exhibit high shear stabilities at the elevated temperatures (i.e., about 50° C. to about 120° C.). FIG. 1 shows the effect of exposing a bitumen emulsion (formulated and produced according to the teachings of this invention) to increasing shear rates using a TA Rheometer at varying temperatures. In these experiments, the shear rate was increased from 0 to 1,000 seconds-inverse in 120 seconds. Because high shear induced coalesce of the emulsion at 25° C., the instrument experienced torque overload. Upon lifting the rotor of the rheometer, black, coalesced bitumen was observed, and grains of large coalesced droplets could be felt in what remained of the original liquid emulsion. At 80° C., the emulsion shows a smooth decrease in viscosity with increasing shear rate.

Example 2

The physical and performance properties of bituminous compositions made using the method of the present invention were also compared to the properties of bitumen and aggregate mixes made according to traditional hot mix asphalt methodologies. All bituminous compositions in this example contained commercially-available, performance-grade PG70-22 bitumen, and were prepared with a bitumen content of 4.8% by total weight of the graded aggregate.

Bituminous compositions of the present invention were prepared by the following procedure. Solvent-free bitumen emulsions were prepared using tallow polyalkylenepolyamines emulsifier at 1.0% by total weight of the bitumen emulsion (bwe). The emulsifier was dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was a commercially-available, performance-grade PG70-22. The bitumen was heated to 130° C. and added to the Atomix colloid mill, wherein the soap solution and bitumen mixture was processed to produce bitumen emulsion. The bitumen content of the finished bitumen emulsion was about 60-63% bwe. The bitumen emulsions were subsequently diluted with water to 53.3% bitumen content prior to mixing with aggregate.

For bituminous compositions made in this example according to the method of the present invention, the graded aggregate of Example 1 was heated to about 80° C. in an oven while the bitumen emulsion was heated to about 60° C. About 1,000 grams of heated graded aggregate were placed in a 1-gallon stainless steel bucket. To the 1,000 grams of aggregate at 80° C. was added 90 g of 60° C. bitumen emulsion. The mixture was stirred by hand for approximately 60 seconds to produce the bituminous compositions containing about 4.8% bitumen by total weight of the graded aggregate.

The resulting bitumen compositions (having a temperature in the range of about 60° C. to about 80° C.) were added to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°.

The compacted bituminous compositions were placed in a 25° C. oven and allowed to cure for four hours. After four hours of curing, the physical and performance properties of the compacted and cured bituminous compositions were measured.

For comparison purposes, a hot mix specimen having equivalent aggregate gradation and bitumen content was made according to standard laboratory procedures for the preparation of hot mix bituminous compositions. Graded aggregate was prepared as in Example 1. About 1,000 grams of graded aggregate heated to 140° C. were placed in a 1-gallon stainless steel bucket. To the 1,000 grams of heated aggregate was added 48 grams of a PG70-22 bitumen, which had been previously heated to 140° C. The mixture was stirred by hand for approximately 30 seconds to distribute the bitumen over the surface of the hot aggregate. The coated aggregate was returned to the oven and heated until the temperature reached 140° C. The resulting hot mix bituminous composition was removed and stirred a second time by hand for 30 seconds, then transferred to a 100-mm gyratory compaction mold which had been previously heated to 140° C. The gyratory compaction mold and bituminous composition were returned to the 140° C. oven for 20 minutes. The hot mix bitumen composition was then compacted using 30 gyrations of a SHRP Pine gyratory compactor at 600 kPa pressure and a gyration angle of 1.25°.

The compacted hot mix bituminous compositions were placed in a 25° C. oven and allowed to cure for four hours. After four hours of curing, the physical and performance properties of the compacted and cured hot mix bituminous compositions were measured.

A second compacted hot mix bituminous composition was prepared according to the aforementioned hot mix procedure except that the temperature used in all mixing, heating, and compaction steps was 160° C. instead of 140° C.

For further comparison purposes, a cold mix bituminous composition was produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The resulting cold mix bitumen compositions at ambient temperature were added to a 100-mm diameter gyratory compaction mold, which was also at ambient temperature. The ambient-temperature bitumen compositions were then compacted using 30 gyrations of a SHRP Pine gyratory compactor at 600 kPa pressure and a gyration angle of 1.25°.

The compacted bitumen compositions were placed in a 25° C. oven and allowed to cure for four hours. After four hours of curing, the physical and performance properties of the compacted and cured cold mix bituminous compositions were measured.

Standard volumetric procedures were used on all mixes (those made by the method of the present invention, as well as the hot mixes and cold mixes) to determine air voids (Pa). Table 2 shows that the mixes made by the method of the present invention compacted more effectively than either the hot mixes or the cold mixes. Table II further shows that the bituminous emulsions made by the method of the present invention gave air voids (Pa) that were comparable to those of the hot mix specimens, and substantially improved above those of the cold mix specimen. All specimens were fully coated (i.e., percent coating greater than 99%).

TABLE 2

| Physical and Performance Properties | PG70-22 Cold Mix (20-23° C.) | PG70-22 Hot Mix (140° C.) | PG70-22 Hot Mix (160° C.) | Method of the Present Invention |
|---|---|---|---|---|
| Average Pill Height (mm) and Std. Dev. | 64.8 +/− 0.6 | 63.7 +/− 0.0 | 63.7 +/− 0.4 | 62.6 +/− 0.5 |
| Early Cure: Compressive Strength after 4 hours at 25° C. (lb-f) | 1050 | 4600 | 4800 | 2450 |

TABLE 2-continued

| Physical and Performance Properties | PG70-22 Cold Mix (20-23° C.) | PG70-22 Hot Mix (140° C.) | PG70-22 Hot Mix (160° C.) | Method of the Present Invention |
|---|---|---|---|---|
| Full Cure: Compressive Strength after 24 hours at 60° C. (lb-f) | 4125 | 4650 | 5100 | 4875 |
| % Air Voids, Pa | 10.24 | 8.22 | 8.70 | 6.86 |

Example 3

Bituminous compositions of the present invention were produced and compacted using the procedure of Example 2. Solvent-free bitumen emulsions were prepared using tallow polyalkylenepolyamines emulsifier at 0.5% by total weight of the bitumen emulsion (bwe). The bitumen employed in this example was commercially-available, performance-grade PG64-22 bitumen modified with styrene-butadiene-styrene (SBS) polymer. All of the bituminous compositions in this example contained this modified PG64-22 bitumen, and each was prepared with a bitumen content of 4.8% by total weight of the graded aggregate.

TABLE 3

| Physical and Performance Properties | SBS Cold Mix (20-23° C.) | SBS Hot Mix (160° C.) | Method of the Present Invention |
|---|---|---|---|
| Average Pill Height (mm) and Std. Dev. | 64.8 +/− 0.1 | 63.8 +/− 0.4 | 62.6 +/− 0.5 |
| Early Cure: Compressive Strength after 4 hours at 25° C. (lb-f) | 1350 | 6400 | 3400 |
| Full Cure: Compressive Strength after 24 hours at 60° C. (lb-f) | 4875 | Not run | 5750 |
| % Air Voids, Pa | 8.86 | Not run | 4.92 |

For comparison purposes, a hot mix bituminous composition having equivalent aggregate gradation and bitumen content to the above-noted bituminous composition was produced and compacted using the procedure of Example 2.

For further comparison purposes a cold mix bituminous composition was also produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 3.

Example 4

Bituminous compositions of the present invention were produced and compacted using the procedure of Example 2. Solvent-free bitumen emulsions were prepared using alkyl alkylenepolyamine emulsifiers at dosages ranging from 1.0% to 0.5% by total weight of the bitumen emulsion (bwe). The bitumen employed in this example was a commercially-available, performance-grade unmodified PG64-22. All of the bituminous compositions in this example contained this PG64-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 4 below.

As shown in Table 4, the pills made with the bituminous compositions of the present invention exhibited compressive strength values after curing at 25° C. for four hours which were 86%-163% stronger than the identical similarly-formulated, emulsion-based cold mix bituminous compositions made and compacted at ambient laboratory conditions. Additionally, the bituminous compositions of the present invention showed substantially improved densification when compared to the cold mix compositions. Likewise, the present bituminous compositions had calculated air voids (Pa) 2.76 to 3.72 percent points lower than the Pa values of the comparable cold mix specimens (each mm of pill height corresponds to roughly 1.2% air content in the specimen).

TABLE 4

| | Cold mix | | Present Invention | | | Increase in |
|---|---|---|---|---|---|---|
| Emulsifier Dosage (%) | Pill Height (mm) | Compressive Strength after Curing 4 hours at 25° C. (lb-f) | Pill Height (mm) | Increase in Densification - Change in Pa vs cold mix (delta Pa) | Compressive Strength after Curing 4 hours at 25° C. (lb-f) | Strength Development - Percent change vs cold mix |
| 1.0 | 65.5 | 850 | 62.6 | −3.48 | 2200 | 159% |
| 0.75 | 66.0 | 950 | 62.9 | −3.72 | 2500 | 163% |
| 0.5 | 65.8 | 1400 | 63.5 | −2.76 | 2600 | 86% |

Example 5

Bituminous compositions of the present invention were produced and compacted using the procedure of Example 2. Solvent-free bitumen emulsions were prepared using tallow polyalkylenepolyamine emulsifier at dosages ranging from 1.0% to 0.5% by total weight of the bitumen emulsion (bwe). The bitumen employed in this example was a commercially-available, performance-grade PG70-22. All of the bituminous compositions in this example contained this PG70-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 5.

TABLE 5

| | Cold mix | | Present Invention | |
|---|---|---|---|---|
| Emulsifier Dosage (%) | Pill Height (mm) | Compressive Strength (lb-f) | Pill Height (mm) | Compressive Strength (lb-f) |
| 1.0 | 63.8 | 1300 | 62.1 | 2850 |
| 0.75 | 65.6 | 1550 | 62.4 | 3750 |
| 0.5 | 66.5 | 2000 | 63.1 | 3050 |

The pills made with the bituminous compositions of the present invention exhibited compressive strength values after curing at 25° C. for four hours which were 52%-142% stronger than the identical similarly-formulated, emulsion-based cold mix bituminous compositions made and compacted at ambient laboratory conditions. Additionally, the bituminous compositions of the present invention showed substantially improved compaction compared to the analogous cold mix compositions as measured by the heights of the pill specimens.

Example 6

Bituminous compositions of the present invention were produced and compacted using the procedure of Example 2. Solvent-free bitumen emulsions were prepared using tallow polyalkylenepolyamine emulsifier at dosages ranging from 1.0% to 0.5% by total weight of the bitumen emulsion (bwe). The bitumen employed in this example was a commercially-available, performance-grade PG64-22 bitumen modified with styrene-butadiene-styrene block copolymer. All of the bituminous compositions in this example contained this modified PG64-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 6.

TABLE 6

| | Cold mix | | Present Invention | |
|---|---|---|---|---|
| Emulsifier Dosage (%) | Pill Height (mm) | Compressive Strength (lb-f) | Pill Height (mm) | Compressive Strength (lb-f) |
| 1.0 | 65.2 | 1200 | 63.0 | 3050 |
| 0.75 | 65.6 | 1450 | 62.9 | 2800 |
| 0.5 | 66.5 | 1650 | 63.2 | 2650 |

As shown in Table 6, the pills made with the bituminous compositions of the present invention exhibited compressive strength values after curing at 25° C. for four hours which were stronger than the identical similarly-formulated, emulsion-based cold mix bituminous compositions made and compacted at ambient laboratory conditions. Additionally, the bituminous compositions of the present invention showed substantially improved compaction compared to the analogous cold mix compositions as measured by the heights of the pill specimens.

Example 7

Bituminous compositions of the present invention were produced and compacted using the procedure of Example 2. Solvent-free bitumen emulsions were prepared using tallow polyalkylenepolyamine emulsifier at 0.5% by total weight of the bitumen emulsion (bwe). The bitumen employed in this example was a commercially-available, performance-grade PG64-22 bitumen modified via the addition of styrene-butadiene-rubber (SBR). Two levels of bitumen modification were examined: 1% SBR bwe and 3% SBR bwe. All of the bituminous compositions in this example contained modified PG64-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

TABLE 7

| | Cold mix | | Present Invention | |
|---|---|---|---|---|
| SBR modification level | Pill Height (mm) | Compressive Strength (lb-f) | Pill Height (mm) | Compressive Strength (lb-f) |
| 1% bwe | 66.8 | 950 | 63.2 | 3050 |
| 3% bwe | 67.1 | 900 | 63.4 | 2800 |

The physical and performance properties of the respective compacted and cured bituminous compositions were measured, and the results are shown in Table 7.

As shown in Table 7, the pills made with the bituminous compositions of the present invention made at 1% SBR bwe exhibited compressive strength values after curing at 25° C. for four hours which was over 220% higher than the identical similarly-formulated, emulsion-based cold mix bituminous compositions made and compacted at ambient laboratory conditions, while the pills made at 3% SBR bwe exhibited a 210% increase in compressive strength over the corresponding cold mix pills. Additionally, the bituminous compositions of the present invention showed substantially improved compaction compared to the analogous cold mix compositions as measured by the heights of the pill specimens.

Example 8

Bituminous compositions of the present invention were produced and compacted using the procedure of Example 2. Solvent-free bitumen emulsions were prepared using modified tall oil condensate of polyethylene polyamine at dosages ranging from 1.0% to 1.5% by total weight of the bitumen emulsion (bwe). Three commercially-available, performance grade bitumen types were employed in this example: a PG64-22, a PG78-28, and a styrene-butadiene-styrene (SBS) modified PG64-22. Each of the bituminous compositions was prepared with a bitumen content of 4.8% by total weight of the graded aggregate.

The bitumen emulsion used in the evaluations shown in FIG. 2, produced in Example 7 below, contains 1.0% bwe of emulsifier (modified tall oil fatty acid condensate of polyethylene polyamine).

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 8.

TABLE 8

| Bitumen Type | Emulsifier Dosage (%) | Cold mix | | Present Invention | |
|---|---|---|---|---|---|
| | | Pill Height (mm) | Compressive Strength (lb-f) | Pill Height (mm) | Compressive Strength (lb-f) |
| PG64-22 | 1.0 | 65.5 | 800 | 62.3 | 2450 |
| | 1.5 | 62.6 | 975 | 62.5 | 1950 |
| PG78-28 | 1.5 | 63.6 | 1600 | 62.8 | 3600 |
| SBS-modified | 1.0 | 65.2 | 1150 | 62.8 | 2700 |
| | 1.5 | 63.1 | 1175 | 63.0 | 2850 |

As shown in Table 8, the pills made with the bituminous compositions of the present invention exhibited compressive strength values after curing at 25° C. for four hours which were stronger than the identical similarly-formulated, emulsion-based cold mix bituminous compositions made and compacted at ambient laboratory conditions. Additionally, the bituminous compositions of the present invention showed improved compaction compared to the analogous cold mix compositions as measured by the heights of the pill specimens.

Figure 2:
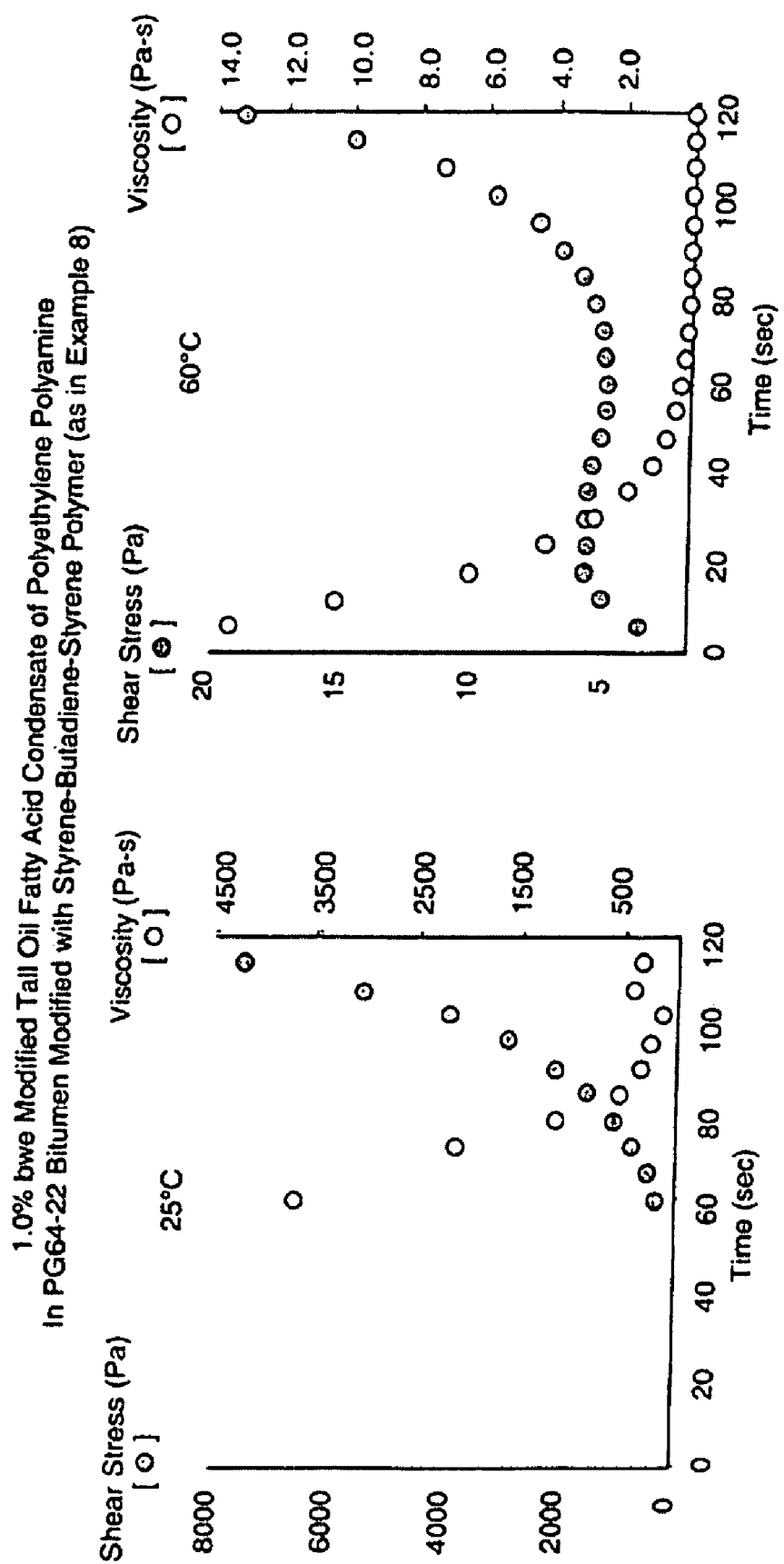
FIG. 2 shows the shear stress evaluation of a bitumen emulsion produced in Example 8 containing 1.0% bwe of emulsifier (modified tall oil fatty acid condensate of polyethylene polyamine) at 60% residue of PG64-22 bitumen.

FIG. 2 shows comparable results using a differently formulated emulsion. The bitumen emulsion used in the evaluations shown in FIG. 2, contains 1.0% bwe of emulsifier (modified tall oil fatty acid condensate of polyethylene polyamine) at 60% residue of PG64-22 bitumen (a performance-grade bitumen modified with a styrene-butadiene-styrene block copolymer). Again, at 25° C., the analysis showed the irregular viscosity build as the shear rate increased from 0 to 1,000 seconds-inverse. At 60° C., the viscosity steadily decreased as the shear rate (and shear stress increased).

Example 9

Bituminous compositions of the present invention were produced and compacted using the procedure of Example 2. Solvent-free bitumen emulsions were prepared using as an emulsifier modified and unmodified C16-C18 fatty acid condensate of polyethylene polyamine at dosages ranging from 1.0% to 1.5% by total weight of the bitumen emulsion (bwe). Three commercially-available, performance grade bitumen types were employed in this example: a PG64-22, a PG70-22, and a styrene-butadiene-styrene (SBS) modified PG64-22. Each of the bituminous compositions was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 9 below.

TABLE 9

| Bitumen Type | Emulsifier Dosage (%) | Cold mix | | Present Invention | |
|---|---|---|---|---|---|
| | | Pill Height (mm) | Compressive Strength (lb-f) | Pill Height (mm) | Compressive Strength (lb-f) |
| PG64-22 | 1.0 | 65.6 | 900 | 62.9 | 1800 |
| | 0.75 | 65.7 | 900 | 62.7 | 1800 |
| PG70-22 | 0.75 | 65.9 | 1350 | 62.0 | 2600 |
| SBS-modified | 0.50 | 66.7 | 1500 | 64.0 | 3700 |

As shown in Table 9, the pills made with the bituminous compositions of the present invention exhibited compressive strength values after curing at 25° C. for four hours which were stronger than the identical similarly-formulated, emulsion-based cold mix bituminous compositions made and compacted at ambient laboratory conditions. Additionally, the bituminous compositions of the present invention showed substantially improved compaction compared to the analogous cold mix compositions as measured by the heights of the pill specimens.

Figure 3:
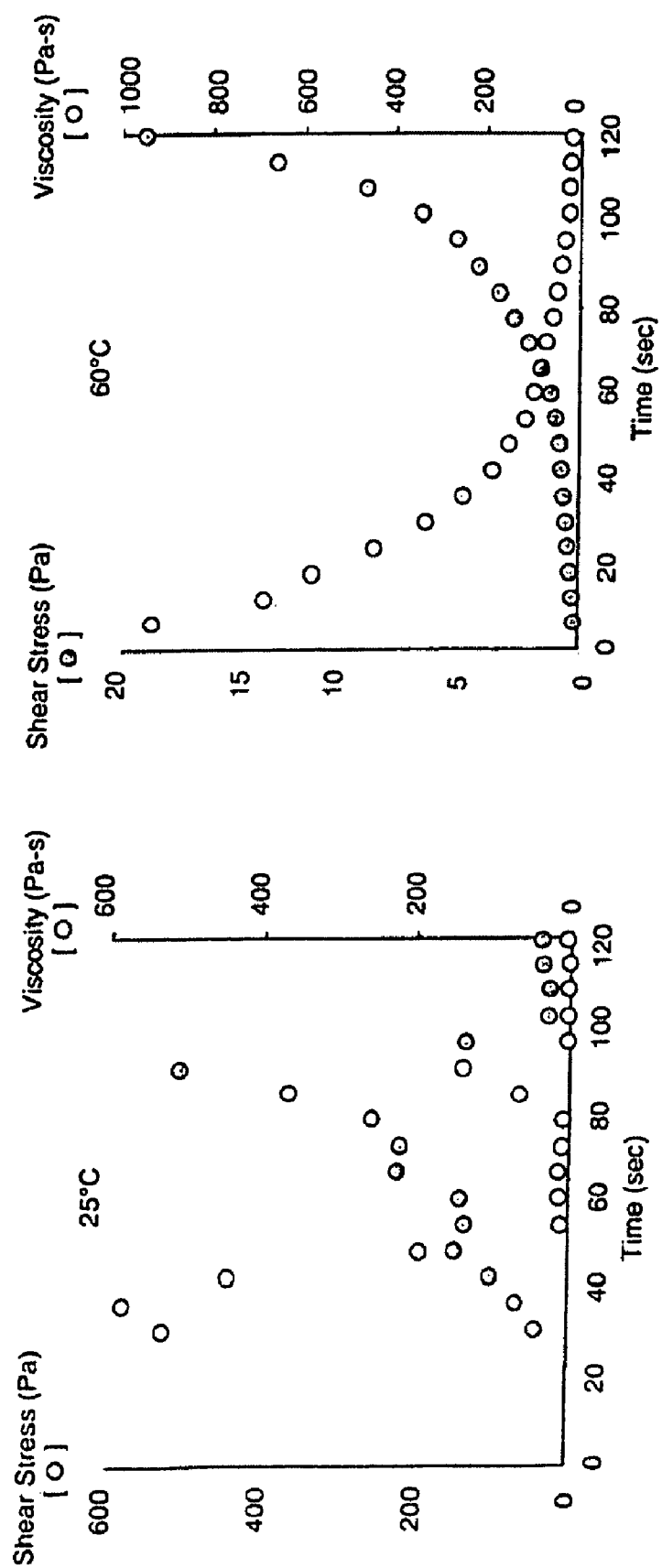
FIG. 3 shows the shear stress evaluation of a bitumen emulsion produced in Example 9 containing 0.75% bwe of emulsifier (a blend of modified and unmodified C16-C18 fatty acid condensate of polyethylene polyamine) at 60% residue of PG70-22 bitumen.

FIG. 3 also shows comparable results in yet another differently formulated bitumen emulsion. The bitumen emulsion used in the evaluations shown in FIG. 3, contains 0.75% bwe of emulsifier (modified and unmodified C16-C18 fatty acid condensate of polyethylene polyamine) at 60% residue of PG70-22 bitumen.

Example 10

Bituminous compositions of the present invention were produced and compacted using the procedure of Example 2. Solvent-free bitumen emulsions were prepared using alkyl quaternary amines emulsifier at 0.75% by total weight of the bitumen emulsion (bwe). Three commercially-available, performance grade bitumen types were employed in this example: a PG64-22, a PG70-22, and a styrene-butadienestyrene (SBS) modified PG64-22. Each of the bituminous compositions was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 10.

TABLE 10

| Bitumen Type | Cold mix | | Present Invention | |
| --- | --- | --- | --- | --- |
| | Pill Height (mm) | Compressive Strength (lb-f) | Pill Height (mm) | Compressive Strength (lb-f) |
| PG64-22 | 63.5 | 1150 | 62.7 | 2200 |
| PG70-22 | 63.5 | 1100 | 63.2 | 2500 |
| SBS-modified | 64.3 | 1250 | 63.5 | 2150 |

As shown in Table 10, the pills made with the bituminous compositions of the present invention exhibited compressive strength values after curing at 25° C. for four hours which were stronger than the identical similarly-formulated, emulsion-based cold mix bituminous compositions made and compacted at ambient laboratory conditions. Additionally, the bituminous compositions of the present invention showed improved compaction compared to the analogous cold mix compositions as measured by the heights of the pill specimens.

Example 11

Bituminous compositions of the present invention were produced and compacted using the procedure of Example 2. Solvent-free bitumen emulsions were prepared using as an emulsifier a blend of tallow polyalkylenepolyamine and aminated natural resins from the general class known as quebracho resins at 1.5% by total weight of the bitumen emulsion (bwe). Two commercially-available, performance grade bitumen types were employed in this example: a PG64-22 and a styrene-butadiene-styrene (SBS) modified PG64-22. Each of the bituminous compositions was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table 11.

TABLE 11

| Bitumen Type | Cold mix | | Present Invention | |
| --- | --- | --- | --- | --- |
| | Pill Height (mm) | Compressive Strength (lb-f) | Pill Height (mm) | Compressive Strength (lb-f) |
| PG64-22 | 64.8 | 850 | 62.9 | 1975 |
| SBS-modified | 64.0 | 1100 | 62.7 | 2450 |

As shown in Table 11, the pills made with the bituminous compositions of the present invention exhibited compressive strength values after curing at 25° C. for four hours which were stronger than the identical similarly-formulated, emulsion-based cold mix bituminous compositions made and compacted at ambient laboratory conditions. Additionally, the bituminous compositions of the present invention showed improved compaction compared to the analogous cold mix compositions as measured by the heights of the pill specimens.

Example 12

A bituminous composition of the present invention was produced and compacted using the procedure of Example 2. A solvent-free bitumen emulsion was prepared using as an emulsifier a blend of 0.2% by total weight of the bitumen emulsion (bwe) of tallow polyalkylenepolyamines and 0.8% bwe of polyethylenepolyamine condensate of modified and unmodified fatty acids. The bitumen employed in this example was a commercially-available, performance-grade PG64-22 bitumen. Each of the bituminous compositions in this example contained PG64-22 bitumen, and was prepared with a bitumen content of 4.8% by total weight of the graded aggregate.

For comparison purposes, a cold mix bituminous composition was produced having equivalent aggregate gradation and bitumen content. The procedure for the production of the bituminous composition of the present invention noted above was followed for producing the cold mix bituminous composition with the exception that the bitumen emulsion and the graded aggregate were each at ambient room temperature (23° C.) when mixed in the bucket.

The physical and performance properties of the respective compacted and cured bituminous compositions were measured, and the results are shown in Table 12.

TABLE 12

| Bitumen Type | Cold mix | | Present Invention | |
| --- | --- | --- | --- | --- |
| | Pill Height (mm) | Compressive Strength (lb-f) | Pill Height (mm) | Compressive Strength (lb-f) |
| PG64-22 | 66.3 | 850 | 63.1 | 2400 |

As shown in Table 12, the pills made with the bituminous composition of the present invention exhibited a compressive strength value after curing at 25° C. for four hours which was stronger than the identical similarly-formulated, emulsion-based cold mix bituminous composition made and compacted at ambient laboratory conditions. Additionally, the bituminous composition of the present invention showed improved compaction compared to the analogous cold mix composition as measured by the heights of the pill specimens.

Example 13

Bituminous compositions of the present invention were prepared by the following procedure. Solvent-free bitumen emulsions were prepared using tallow polyalkylenepolyamines emulsifier at 0.5% by total weight of the bitumen emulsion (bwe). The emulsifier was dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was a commercially-available, performance-grade PG64-22. The bitumen was heated to 130° C. and added to the Atomix colloid mill, wherein the soap solution and bitumen mixture was processed to produce bitumen emulsion. The bitumen content of the finished bitumen emulsion was about 60-63% bwe. The bitumen emulsions were subsequently diluted with water to 53.3% bitumen content prior to mixing with aggregate.

The graded aggregate of Example 1 was heated to about 80° C. in an oven while the bitumen emulsion was heated to about 60° C. About 1,000 grams of heated graded aggregate were placed in a 1-gallon stainless steel bucket. To the 1,000 grams of aggregate at 80° C. was added 90 g of 60° C. bitumen emulsion. The mixture was stirred by hand for approximately 60 seconds to produce the bituminous compositions containing about 4.8% bitumen by total weight of the graded aggregate.

One of the resulting bitumen compositions (having a temperature in the range of about 60° C. to about 80° C.) was added to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°. The compacted bituminous composition was subsequently placed in a 25° C. oven and allowed to cure for four hours. After four hours of curing, the physical and performance properties of the compacted and cured bituminous composition were measured.

The other resulting bitumen composition (having a temperature in the range of about 60° C. to about 80° C.) was loaded into a polyethylene bag and placed in an oven having a temperature maintained at 60° C. After three hours, the bitumen composition (having a temperature of about 60° C.) was removed from the oven and loaded into a 100-mm diameter gyratory compaction mold, which had been preheated to 60° C. The bitumen composition was then compacted using 30 gyrations of a SHRP Pine gyratory compactor at 600 kPa pressure and a gyration angle of 1.25°. The compacted bituminous composition was placed in a 25° C. oven and allowed to cure for four hours. After four hours of curing, the physical and performance properties of the compacted and cured bituminous composition were measured.

The physical and performance properties of the respective compacted and cured bituminous compositions were measured, and the results showed that storage did not adversely affect the coating, compactability, or early strength of the bituminous compositions. This indicates that the workability of the bituminous compositions was not compromised or decreased by storage.

Example 14

Bituminous compositions of the present invention were prepared by the following procedure. Solvent-free bitumen emulsions were prepared using tallow polyalkylenepolyamines emulsifier at 0.5% by total weight of the bitumen emulsion (bwe). The emulsifier was dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was a commercially-available, performance-grade styrene-butadiene-styrene (SBS) modified PG64-22. The bitumen was heated to 130° C. and added to the Atomix colloid mill, wherein the soap solution and bitumen mixture was processed to produce bitumen emulsion. The bitumen content of the finished bitumen emulsion was about 60-63% bwe. The bitumen emulsions were subsequently diluted with water to 53.3% bitumen content prior to mixing with aggregate.

The graded aggregate of Example 1 was heated to about 80° C. in an oven while the bitumen emulsion was heated to about 60° C. About 1,000 grams of heated graded aggregate were placed in a 1-gallon stainless steel bucket. To the 1,000 grams of aggregate at 80° C. was added 90 g of 60° C. bitumen emulsion. The mixture was stirred by hand for approximately 60 seconds to produce the bituminous compositions containing about 4.8% bitumen by total weight of the graded aggregate.

One of the resulting bitumen compositions (having a temperature in the range of about 60° C. to about 80° C.) was added to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°. The compacted bituminous composition was subsequently placed in a 25° C. oven and allowed to cure for four hours. After four hours of curing, the physical and performance properties of the compacted and cured bituminous composition were measured.

The other resulting bitumen composition (having a temperature in the range of about 60° C. to about 80° C.) was loaded into a polyethylene bag and placed in an oven having a temperature maintained at 60° C. After 21 hours, the bitumen composition (having a temperature of about 60° C.) was removed from the oven and loaded into a 100-mm diameter gyratory compaction mold, which had been preheated to 60° C. The bitumen composition was then compacted using 30 gyrations of a SHRP Pine gyratory compactor at 600 kPa pressure and a gyration angle of 1.25°. The compacted bituminous composition was placed in a 25° C. oven and allowed to cure for four hours. After four hours of curing, the physical and performance properties of the compacted and cured bituminous composition were measured.

The physical and performance properties of the respective compacted and cured bituminous compositions were measured, and the results showed that storage did not adversely affect the coating, compactability, or early strength of the bituminous compositions. This indicates that the workability of the bituminous compositions was not compromised or decreased by storage.

TABLE 13

Particle Size Distribution At Elevated Temperature

| Time at Indicated | Unmodified Bitumen Emulsion Storage Temperatures | | | | | |
|---|---|---|---|---|---|---|
| Temp. | 25° C. | | 60° C. | | 80° C. | |
| (hours) | mv | <90% | Mv | <90% | mv | <90% |
| 0 | 6.7 | 12.6 | Not run | Not run | Not run | Not run |
| 24 | 6.5 | 12.2 | 6.7 | 12.9 | 6.8 | 13.1 |
| 48 | 6.9 | 13.1 | 6.4 | 12.1 | 7.0 | 13.8 |
| 120 | 7.1 | 14.2 | 5.7 | 10.6 | 4.8 | 7.4 |

TABLE 14

Particle Size Distribution At Elevated Temperature

| Time at Indicated | SBS-Modified Bitumen Emulsion Storage Temperatures | | | | | |
|---|---|---|---|---|---|---|
| Temp. | 25° C. | | 60° C. | | 80° C. | |
| (hours) | mv | <90% | Mv | <90% | mv | <90% |
| 0 | 5.5 | 16.0 | 8.9 | 28.0 | 13.0 | 34.6 |
| 24 | 5.6 | 16.3 | 7.1 | 20.8 | 7.1 | 21.6 |
| 48 | 8.1 | 23.2 | 10.7 | 28.0 | 6.6 | 19.4 |
| 120 | 7.9 | 22.6 | 9.2 | 24.8 | 9.0 | 23.9 |

TABLE 15

Particle Size Distribution At Elevated Temperature

| Time at Indicated | 1% SBR-Modified Bitumen Emulsion Storage Temperatures | | | | | |
|---|---|---|---|---|---|---|
| Temp. | 25° C. | | 60° C. | | 80° C. | |
| (hours) | Mv | <90% | Mv | <90% | mv | <90% |
| 0 | 9.3 | 20.5 | — | — | — | — |
| 48 | 7.6 | 14.7 | 9.5 | 20.8 | — | — |
| 72 | 9.1 | 19.3 | 6.9 | 12.5 | 6.7 | 11.9 |
| 120 | 8.8 | 18.1 | 8.2 | 16.9 | 10.8 | 57.1 |

TABLE 16

Particle Size Distribution At Elevated Temperature

| Time at Indicated | 3% SBR-Modified Bitumen Emulsion Storage Temperatures | | | | | |
|---|---|---|---|---|---|---|
| Temp. | 25° C. | | 60° C. | | 80° C. | |
| (hours) | Mv | <90% | Mv | <90% | mv | <90% |
| 0 | 9.1 | 19.2 | — | — | — | — |
| 48 | 6.6 | 11.5 | 8.4 | 17.0 | — | — |
| 72 | 5.9 | 9.3 | 6.8 | 12.6 | 7.4 | 13.7 |
| 120 | 6.7 | 11.9 | 11.3 | 23.7 | 18.2 | 43.7 |

Example 15

Solvent-free bitumen emulsions suitable for use in the production of bituminous compositions of the present invention were prepared by the following procedure. A series of solvent-free bitumen emulsions were prepared using tallow polyalkylenepolyamines emulsifier at 1.0% by total weight of the bitumen emulsion (bwe). The emulsifier was dissolved in warm water and treated with hydrochloric acid solution to lower the pH to 2.0. The aqueous solution of emulsifier in water (called the "soap solution") was heated to 55° C. and added to an Atomix colloid mill.

Four performance grade bitumen types were employed in this example in produce the series of bitumen emulsions. A commercially available PG64-22 and a commercially available styrene-butadiene-styrene (SBS) modified PG64-22 was used. Also, a PG64-22 bitumen modified via the addition of styrene-butadiene-rubber (SBR) at either 1% SBR bwe or 3% SBR bwe were employed. The respective bitumen were heated to 130° C. and added to the Atomix colloid mill, wherein the soap solution and bitumen mixture was processed to produce bitumen emulsion.

As noted in Tables 13-16 below, the resulting bitumen emulsions show substantially unchanged particle size distributions when held at elevated temperatures for a period of time. Table 13 shows that with the unmodified bitumen the starting mean particle diameter (mv) was lower than in the case of the SBS-modified bitumen (Table 14), as the SBS-modified bitumens give relatively high mean particle size diameters as well as high overall particle size distributions (as reflected in 90th percentile particle diameter).

It is to be understood that the foregoing description relates to embodiments are exemplary and explanatory only and are not restrictive of the invention. Any changes and modifications may be made therein as will be apparent to those skilled in the art. Such variations are to be considered within the scope of the invention as defined in the following claims.

We claim:

1. Bituminous composition comprising:
   (a) solvent-free, oil-in-water bitumen emulsion in an amount from about 2% to about 10% by total weight of the bituminous composition, wherein the oil-in-water bitumen emulsion comprises:
      (i) bitumen in an amount from about 50% to about 75% by total weight of the bitumen emulsion,
      (ii) emulsifier package having an interfacial tension between the bitumen and water of less than 40 dynes/cm at a temperature of 26° C. and at an aqueous concentration of less than 0.1% weight, in an amount from about 0.05% to about 2% by total weight of the bitumen emulsion,
      (ii) water in an amount to complete the emulsion; and
   (b) aggregate in an amount from about 90% to about 98% by total weight of the bituminous composition; and
   wherein the bituminous composition is in an absence of bitumen having a penetration number of more than 220 dmm as determined according to an ASTM standard method D5 at 25° C., and wherein the bituminous composition has a temperature ranging from 50° C. to 140° C.

2. The composition of claim 1, wherein the bitumen comprises at least one member selected from the group consisting of naturally occurring bitumen, bitumen from crude oil, bitumen from petroleum pitch, bitumen from coal tar, polymer-modified bitumen, rubberized bitumen, rubberized bitumen containing recycled tire material, acid-modified bitumen, wax-modified bitumen, and combinations thereof.

3. The composition of claim 1, wherein the bitumen comprises a bitumen modified with at least one compound selected from the group consisting of natural rubber, synthetic rubber, plastomer, thermoplastic resin, thermosetting resin, elastomer, styrene-butadiene-styrene, styrene-butadiene-rubber, polyisoprene, neoprene, associative thickener, starch, polybutylene, butadiene-styrene rubber, vinyl polymer, ethylene vinyl acetate, sulfur-containing crosslinker, salt, acid modifier, wax modifier, and combinations thereof.

4. The composition of claim 1, wherein the emulsifier package comprises an anionic emulsifier.

5. The composition of claim 4, wherein the anionic emulsifier comprises at least one member selected from the group consisting of C-12 to C-24 fatty acids; Diels-Alder adducts of C-12 to C-24 fatty acids; rosin acids; Diels-Alder adducts of rosin acids; natural resinous polymers; quebracho resins; tannins; lignous polymers; polyacrylic acid; polyacrylate; alkyl sulfonates; alkyl benzyl sulfonates; alkyl sulfates; alkyl phosphonates; alkyl phosphates; phenolic resins; organic sulfates; organic sulfonates; organic phosphates; organic phosphonates; and combinations thereof.

6. The composition of claim 1, wherein the emulsifier package comprises an amphoteric emulsifier.

7. The composition of claim 1, wherein the emulsifier package comprises a cationic emulsifier.

8. The composition of claim 7, wherein the cationic emulsifier comprises at least one member selected from the group consisting of fatty imidoamines; fatty amidoamines; polyoxyethylene monoamines; polyoxypropylene monoamines; polyoxyethylene polypropylenepolyamines; polyoxypropylene polypropylenepolyamines; C-12 to C-24 alkyl aryl monoamines; C-12 to C-24 alkyl aryl polypropylenepolyamines; C-12 to C-24 quaternary amines; C-12 to C-24 alkyl ether amines; C-12 to C-24 alkylether polyamines; C-12 to C-24 alkyl monoamines; C-12 to C-24 alkyl polypropylenepolyamines; C-12 to C-24 alkyl polypropylene polyamine N-oxide; amine derivatives of tannins; amine derivatives of phenolic resins; amine derivatives of lignins; amine-modified polyacrylates; and combinations thereof.

9. The composition of claim 1, wherein the emulsifier package comprises a nonionic emulsifier.

10. The composition of claim 9, wherein the nonionic emulsifier comprises at least one member selected from the group consisting of alkylaryl polyethylene oxide derivative of alkanol; polypropylene oxide derivative of alkanol; polyethylene oxide derivative of alkanol; polypropylene oxide derivative of alkanol; polyethoxylated emulsifier; polypropoxylated emulsifier; sorbitan esters; saccharide-based surfactants; protein stabilizer; mechanical stabilizers; alkyl polysaccharide; alkylphenol alkoxylate; fatty alcohol ethoxylate; fatty acid propoxylate; ethoxylate of escinoleic acid; ethoxylate of castor oil; propoxylate of escinoleic acid; propoxylate of castor oil; and combinations thereof.

11. The composition of claim 1, wherein the emulsifier package comprises at least one member selected from the group consisting of polyethylene-polypropylene block copolymer; hydroxypoly(oxyethylene) poly(oxypropylene) poly(oxyethylene) block copolymers; 1,2-propyleneglycol ethoxylated; 1,2-propyleneglycol propoxylated; synthetic block copolymer of ethylene oxide and propylene oxide having molecular weights exceeding 300 g/mole; decyl alcohol ethoxylates; castor oil ethoxylate; ceto-oleyl alcohol ethoxylate; ethoxylated alkanolamide; fatty alcohol alkoxylates; dinonyl phenol ethoxylate; nonyl phenol ethoxylate; sorbitan ester ethoxylate; alkyl ether sulphate; monoalkyl sulphosuccinamate; alkyl phenol ether sulphate; fatty alcohol sulphate; di-alkyl sulphosuccinate; alkyl ether phosphate; alkyl phenol ether phosphate; alkyl naphthalene sulphonate; -olefin sulphonate; alkyl benzene sulphonic acids and salt, alkyl ampho (di)acetate; alkyl betaine; alkyl polysaccharide; alkylamine ethoxylate; amine oxide; oligomeric ethyleneamine; oligomeric polypropyleneamine; hexamethylene diamine; bis-hexamethylene diamine; oligomeric aziridine; polyaziridine; polyethylene polyamine; polypropylene polyamine; polyethylene/polypropylene polyamine; distillation residue from polyalkylene polyamine manufacture; higher order polyalkylene polyamine; homolog of hydroxyalkyl amine; C-36 dimeric fatty acid; C-54 trimeric fatty acid; amides of C-36 dimeric fatty; polyamides of C-36 dimeric fatty; polyamides of C-54 trimeric fatty amide; salts of C-36 dimeric fatty acid; salts of C-54 trimeric fatty acid; hydroxystearic acid; oligomer of hydroxystearic acid; polymeric hydroxystearic acid; polyalkyleneamide of hydroxystearic acid; polyalkyleneamide of oligomer of hydroxystearic acid; polyalkyleneamide of polymeric hydroxystearic acid; salts of hydroxystearic acid; salts of oligomer of hydroxystearic acid; salts of polymeric hydroxystearic acid; dialkylarylamine; salts of dialkylarylamine; bisamides of polyalkylenepolyamine; salts of (polyalkylenepolyamine)bisamides; and combinations thereof.

12. The composition of claim 1, wherein the emulsifier package comprises a member selected from the group consisting of:
(i) ethoxytrimethyleneamine derivatives of C-12 to C-24 fatty amines of structure (I)

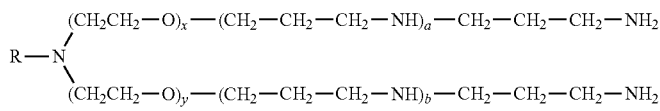

wherein R=C-12 to C-24, x+y≧2, and a, b≧0;
(ii) propoxytrimethyleneamine derivatives of C-12 to C-24 fatty amines of structure (II)

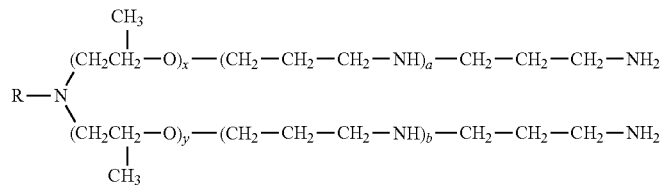

wherein R = C-12 to C-24, x + y ≥ 2, a, b ≥ 0;

wherein R=C-12 to C-24, x+y≧2, a, b≧0;
(iii) aliphatic dialkylamine of structure (III)

wherein $R^1$, $R^2$ = C-12 to C-24;

wherein $R^1$, $R^2$=C-12 to C-24;
(iv) quaternary amine of structure (IV)

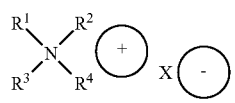

wherein $R^1$, $R^2$=C-12 to C-24, and $R^3$, $R^4$=methyl or higher order homolog of C-12 to C-24 moieties;
(v) quaternary amine of structure (V)

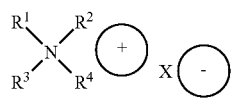

wherein $R^1$, $R^2$=C-12 to C-24, $R^3$, $R^4$=ethoxy moieties, propoxy moieties, or combinations thereof;
(vi) polyamide of structure (I);
(vii) polyamide of structure (II);
(viii) salt of structure (III);
(ix) salts of structure (IV); and
(x) salts of structure (V).

13. The composition of claim 1, wherein the emulsifier package comprises a member selected from the group consisting of oligomerics of acrylic acids; polymers of acrylic acids; oligomerics of acrylic ester; polymers of acrylic ester; oligomerics of acrylic amides; polymers of acrylic amides; oligomerics of styrene monomers, polymers of styrene monomers; alkene oligomers; poly(alkene); diene oligomers; polydiene; oligomerics of hydroxylated propene; polymers of hydroxylated propene; oligomerics of polyhyrdoxylated polyalkene; polymers of polyhydroxylated polyalkene; oligomerics of halogenated ethylene; polymers of halogenated ethylene; oligomerics of halogenated alkene; polymers of halogenated alkylene; oligomerics of halogenated alkylidene; polymers of halogenated alkylidene; and combinations thereof.

14. The composition of claim 1, wherein the emulsifier package comprises a member selected from the group consisting of salts of oligomerics of acrylic acids; salts of polymers of acrylic acids; salts of oligomerics of acrylic ester; salts of polymers of acrylic ester; salts of oligomerics of acrylic amides; salts of polymers of acrylic amides; salts of oligomerics of styrene monomers, salts of polymers of styrene monomers; salts of alkene oligomers; salts of poly(alkene); salts of diene oligomers; salts of polydiene; salts of oligomerics of hydroxylated propene; salts of polymers of hydroxylated propene; salts of oligomerics of polyhydroxylated polyalkene; salts of polymers of polyhydroxylated polyalkene; salts of oligomerics of halogenated ethylene; salts of polymers of halogenated ethylene; salts of oligomerics of halogenated alkene; salts of polymers of halogenated alkylene; salts of oligomerics of halogenated alkylidene; polymers of halogenated alkylidene; salts of oligomeric ethyleneamine; salts of oligomeric polypropyleneamine; salts of hexamethylene diamine; salts of bis-hexamethylene diamine; salts of oligomeric aziridine; salts of polyaziridine; salts of polyethylene polyamine; salts of polypropylene polyamine; salts of polyethylene/polypropylene polyamine; salts of polyalkylene polyamine; salts of higher order polyalkylene polyamine; and combinations thereof.

15. The composition of claim 1, wherein the emulsifier package comprises a member selected from the group consisting of amides of oligomeric ethyleneamine; amides of oligomeric polypropyleneamine; amides of hexamethylene diamine; amides of bis-hexamethylene diamine; amides of oligomeric aziridine; amides of polyaziridine; amides of polyethylene polyamine; amides of polypropylene polyamine; amides of polyethylene/polypropylene polyamine; amides of polyalkylene polyamine; amides of higher order polyalkylene polyamine; and combinations thereof.

16. The composition of claim 1, wherein the emulsifier package comprises a member selected from the group consisting of amido salts of oligomeric ethyleneamine; amido salts of oligomeric polypropyleneamine; amido salts of hexamethylene diamine; amido salts of bis-hexamethylene diamine; amido salts of oligomeric aziridine; amido salts of polyaziridine; amido salts of polyethylene polyamine; amido salts of polypropylene polyamine; amido salts of polyethylene/polypropylene polyamine; amido salts of polyalkylene polyamine; amido salts of higher order polyalkylene polyamine; and combinations thereof.

17. The composition of claim 1, wherein the emulsifier package has an interfacial tension between the bitumen and water of less than 40 dynes/cm at a temperature of 26° C. and at an aqueous concentration of less than 0.1% weight.

18. The composition of claim 1, wherein the aggregate comprises at least one member selected from the group consisting of dense-graded aggregate, gap-graded aggregate, open-graded, stone-matrix aggregate, reclaimed asphalt pavement material, reclaimed roofing shingles, and combinations thereof.

19. The composition of claim 1, further comprising additive for enhancing processability or improving performance.

20. The composition of claim 1, characterized by its application to a surface being paved at a temperature in a range of about 0° C. to about 120° C.

21. A method for producing a bituminous composition comprising steps of:
(A) preparing oil-in-water bitumen emulsion comprising:
 (i) bitumen in an amount from about 50% to about 75% by total weight of the bitumen emulsion,
 (ii) emulsifier package having an interfacial tension between the bitumen and water of less than 40 dynes/cm at a temperature of 26° C. and at an aqueous concentration of less than 0.1% weight, in an amount from about 0.05% to about 2% by total weight of the bitumen emulsion, and
 (iii) water in an amount to complete the emulsion; and
(B) producing the bituminous composition having a temperature from about 50° C. to about 140° C. by mixing:
 (i) the oil-in-water bitumen emulsion of step (A), having a temperature from about 25° C. to about 95° C., in an amount from about 2% to about 10% by total weight of the bituminous composition, and
 (ii) aggregate having a temperature from about 60° C. to about 140° C., in an amount from about 90% to about 98% by total weight of the bituminous composition;
wherein the bituminous composition is in an absence of bitumen having a penetration number of more than 220 dmm as determined according to an ASTM standard method D5 at 25° C.

22. The method of claim 21, wherein the oil-in-water bitumen emulsion is delivered after production directly into at least one stationary or mobile asphalt mixing unit, wherein the mixing unit comprises at least one member selected from the group consisting of drum mixers, pug-mill batch mixers, dual mixers, and combinations thereof, and wherein the mobile mixing unit comprises equipment used in in-situ or in-place operations.

23. A paved road comprising at least one layer of a bituminous composition, wherein the bituminous composition comprises:
(a) solvent-free, oil-in-water bitumen emulsion in an amount from about 2% to about 10% by total weight of the bituminous composition, wherein the emulsion comprises:
 (i) bitumen in an amount from about 50% to about 75% by total weight of the bitumen emulsion,
 (ii) emulsifier package having an interfacial tension between the bitumen and water of less than 40 dynes/cm at a temperature of 26° C. and at an aqueous concentration of less than 0.1% weight, in an amount from about 0.05% to about 2% by total weight of the bitumen emulsion,
 (iii) water in an amount to complete the emulsion; and
(b) aggregate in an amount from about 90% to about 98% by total weight of the bituminous composition;
wherein the bituminous composition is in an absence of bitumen having a penetration number of more than 220 dmm as determined according to an ASTM standard method D5 at 25° C., and
wherein the bituminous composition is applied to the road at a temperature range of about 55° C. to about 120° C.

24. The paved road of claim 23, wherein the emulsifier package comprises at one member selected from the group consisting of anionic emulsifier, cationic emulsifier, amphoteric emulsifier, nonionic emulsifier, and combinations thereof.

* * * * *

UNITED STATES PATENT AND TRADEMARK OFFICE
CERTIFICATE OF CORRECTION

PATENT NO. : 7,833,338 B2  Page 1 of 1
APPLICATION NO. : 11/852696
DATED : November 16, 2010
INVENTOR(S) : Everett Crews et al.

It is certified that error appears in the above-identified patent and that said Letters Patent is hereby corrected as shown below:

Title Page, Item (73) Assignee: Please change MeadWestvaco Packaging Systems, LLC to --MeadWestvaco Corporation--.

Signed and Sealed this

Twenty-sixth Day of April, 2011

David J. Kappos
*Director of the United States Patent and Trademark Office*